United States Patent
Ishi et al.

(10) Patent No.: US 11,666,977 B2
(45) Date of Patent: *Jun. 6, 2023

(54) INSERT

(71) Applicant: KYOCERA Corporation, Kyoto (JP)

(72) Inventors: Hirohisa Ishi, Moriyama (JP); Shohei Mao, Yasu (JP); Kazuki Yamamichi, Yasu (JP)

(73) Assignee: KYOCERA Corporation, Kyoto (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/715,373

(22) Filed: Apr. 7, 2022

(65) Prior Publication Data

US 2022/0226913 A1 Jul. 21, 2022

Related U.S. Application Data

(63) Continuation of application No. 16/640,376, filed as application No. PCT/JP2018/031166 on Aug. 23, 2018, now Pat. No. 11,325,195.

(30) Foreign Application Priority Data

Aug. 23, 2017 (JP) ................................ 2017-160268

(51) Int. Cl.
*B23C 5/20* (2006.01)

(52) U.S. Cl.
CPC .......... *B23C 5/202* (2013.01); *B23C 2200/08* (2013.01)

(58) Field of Classification Search
CPC ..... B23C 2200/203; B23C 5/10; B23C 5/109; B23C 5/20; B23C 5/207; B23C 5/2213
See application file for complete search history.

(56) References Cited

U.S. PATENT DOCUMENTS

| 4,755,086 | A | 7/1988 | Stashko |
| 5,597,271 | A | 1/1997 | Men et al. |
| 5,688,081 | A | 11/1997 | Paya |
| 5,967,710 | A | 10/1999 | Krenzer |
| 5,971,672 | A | 10/1999 | Hansson |
| 6,186,705 | B1 | 2/2001 | Kumar et al. |
| 6,530,726 | B2 | 3/2003 | Nelson |
| 7,040,844 | B1 | 5/2006 | Daiguji |
| 7,261,497 | B2 | 8/2007 | Maeda |
| 7,281,884 | B2 | 10/2007 | Maeda |
| 7,402,005 | B2 | 7/2008 | Deitert |

(Continued)

FOREIGN PATENT DOCUMENTS

| CN | 107073604 A | 8/2017 |
| JP | 07-501753 A | 2/1995 |

(Continued)

*Primary Examiner* — Nicole N Ramos
(74) *Attorney, Agent, or Firm* — Volpe Koenig

(57) ABSTRACT

An insert may include a first surface, a second surface, a ridge line located at an intersection of the first surface and the second surface. The first surface may include a first corner, a first side and a second side. The ridge line may include a corner cutting edge located on the first corner, a first cutting edge located on the first side, and a second cutting edge located on the second side. The first surface may further include a first region located from the first cutting edge toward a midportion of the first surface, a second region located from the second cutting edge toward the midportion of the first surface, and a concave part located on at least one of the first region and the second region.

6 Claims, 22 Drawing Sheets

(56) References Cited

U.S. PATENT DOCUMENTS

| | | |
|---|---|---|
| 7,905,688 B2 | 3/2011 | Ertl et al. |
| 8,727,675 B2 | 5/2014 | Nam et al. |
| 2001/0014259 A1 | 8/2001 | Inayama |
| 2004/0223818 A1 | 11/2004 | Sheffler et al. |
| 2008/0232912 A1 | 9/2008 | Bhagath et al. |
| 2008/0304924 A1 | 12/2008 | Engstrom et al. |
| 2009/0285646 A1 | 11/2009 | Oprasic et al. |
| 2010/0080662 A1 | 4/2010 | Satran et al. |
| 2012/0009029 A1 | 1/2012 | Saji |
| 2012/0070242 A1 | 3/2012 | Choi et al. |
| 2014/0126970 A1 | 5/2014 | Maeta et al. |
| 2017/0157685 A1 | 6/2017 | Mao |
| 2017/0197259 A1 | 7/2017 | Kumoi et al. |
| 2017/0291231 A1 | 10/2017 | Mao |
| 2017/0326656 A1 | 11/2017 | Saji et al. |

FOREIGN PATENT DOCUMENTS

| | | |
|---|---|---|
| JP | 08-071834 A | 3/1996 |
| JP | 10-510481 A | 10/1998 |
| JP | 2001-025907 A | 1/2001 |
| JP | 2003-275920 A | 9/2003 |
| JP | 2008-279519 A | 11/2008 |
| JP | 5007853 B2 | 8/2012 |

INSERT

CROSS-REFERENCE TO RELATED APPLICATIONS

This application is a continuation application of U.S. Ser. No. 16/640,376 filed on Feb. 20, 2020 which is a national stage entry according to 35 U.S.C. 371 of PCT Application No. PCT/JP2018/031166, filed on Aug. 23, 2018, which claims priority to Japanese Application No. 2017-160268, filed on Aug. 23, 2017, which is entirely incorporated herein by reference.

TECHNICAL FIELD

The present disclosure generally relates to inserts for use in a cutting process. More specifically, the present disclosure relates to inserts used for rotary tools.

BACKGROUND

A cutting tool is discussed in Japanese Unexamined Patent Publication No. 2008-279519 (Patent Document 1) which is usable for a cutting process of a workpiece. A cutting insert (an insert) of Patent Document 1 has a polygonal plate shape and includes a cutting edge located on a ridge line where a polygonal surface intersects with an outer peripheral surface. The cutting tool of Patent Document 1 is usable for a three-dimensional process, such as ramping process.

SUMMARY

An insert in a non-limiting embodiment may include a first surface, a second surface, and a ridge line where the first surface intersects with the second surface. The first surface may include a first corner, a first side extended from the first corner, and a second side extended from the first corner. The ridge line may include a corner cutting edge located on the first corner, a first cutting edge located on at least a part of the first side, and a second cutting edge located on at least a part of the second side. The first surface may further include a first region located from the first cutting edge toward a midportion of the first surface, a second region located from the second cutting edge toward the midportion of the first surface, and a concave part located on at least one of the first region and the second region.

An insert in a non-limiting embodiment may include a first surface, a second surface, and a ridge line where the first surface intersects with the second surface. The first surface may include a first corner, a first side extended from the first corner, and a second side extended from the first corner. The ridge line may include a corner cutting edge located on the first corner, a first cutting edge located on at least a part of the first side, and a second cutting edge located on at least a part of the second side. The first surface may further include a first region located from the first cutting edge toward a midportion of the first surface, a second region located from the second cutting edge toward the midportion of the first surface, and a convex part located on at least one of the first region and the second region.

DETAILED DESCRIPTION

<Cutting Inserts>

Figure 1:
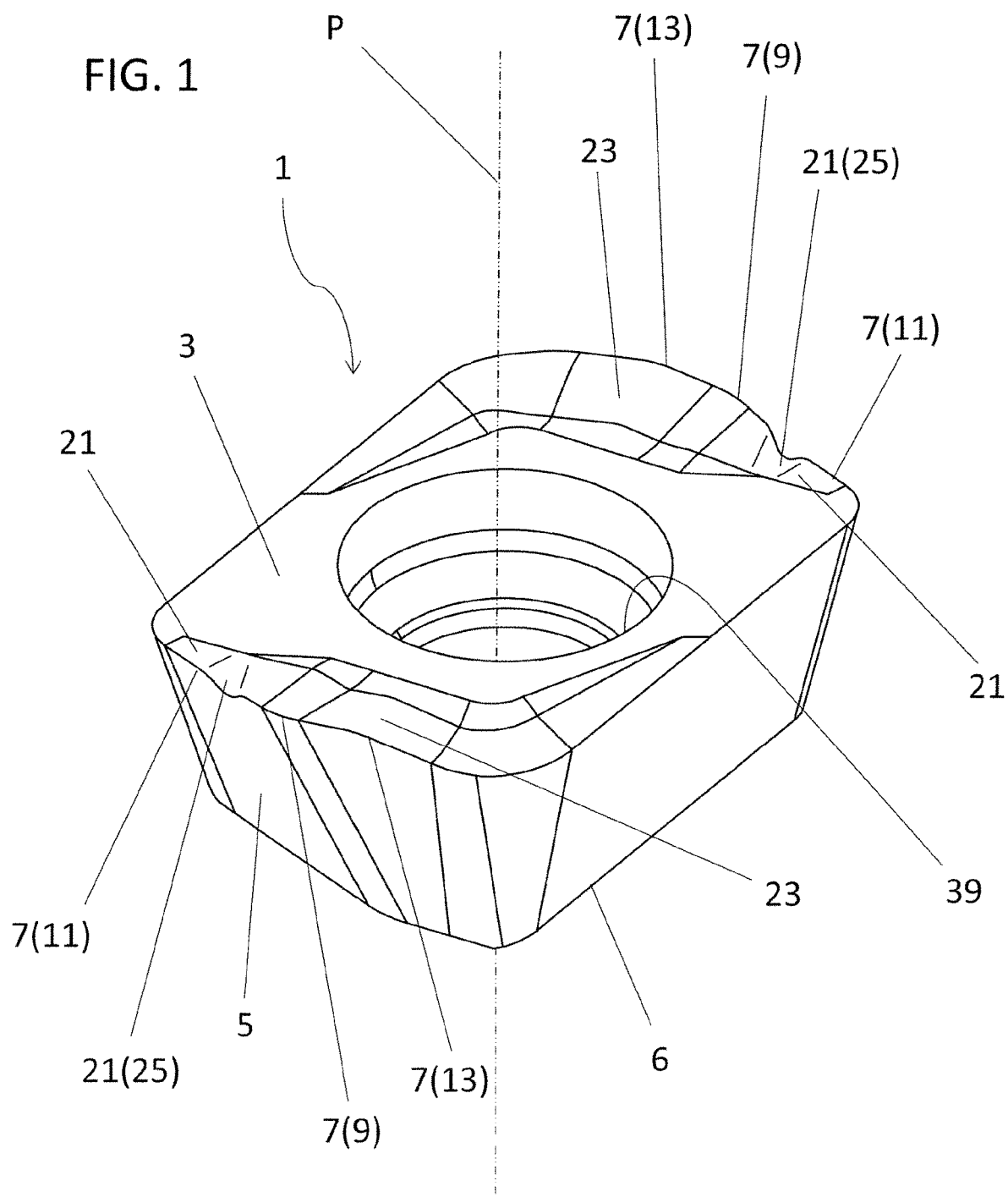
FIG. 1 is a perspective view illustrating a cutting insert in a non-limiting embodiment.

Cutting inserts (hereinafter also referred to simply as "inserts") in non-limiting embodiments may be described in detail below with reference to the drawings. For convenience of description, the drawings referred to in the following illustrate, in simplified form, only main members necessary for describing non-limiting embodiments. The inserts in the present disclosure may be therefore capable of including any arbitrary structural member not illustrated in the drawings referred to. Dimensions of the members in each of the drawings may be ones which faithfully represent neither dimensions of actual structural members nor dimension ratios of these members.

As illustrated in FIG. 1, the insert 1 in a non-limiting embodiment may include a first surface 3 (an upper surface in FIG. 1), a second surface 5 (a side surface in FIG. 1), and a ridge line 7 where the first surface 3 intersects with the second surface 5. The first surface 3 may have a polygonal shape, and the first surface 3 may have an approximately hexagonal shape in a non-limiting embodiment illustrated in FIG. 2. Accordingly, the first surface 3 may include six corners and six sides. Because the first surface 3 has the approximately hexagonal shape, the second surface 5 may include six planar regions.

Figure 2:
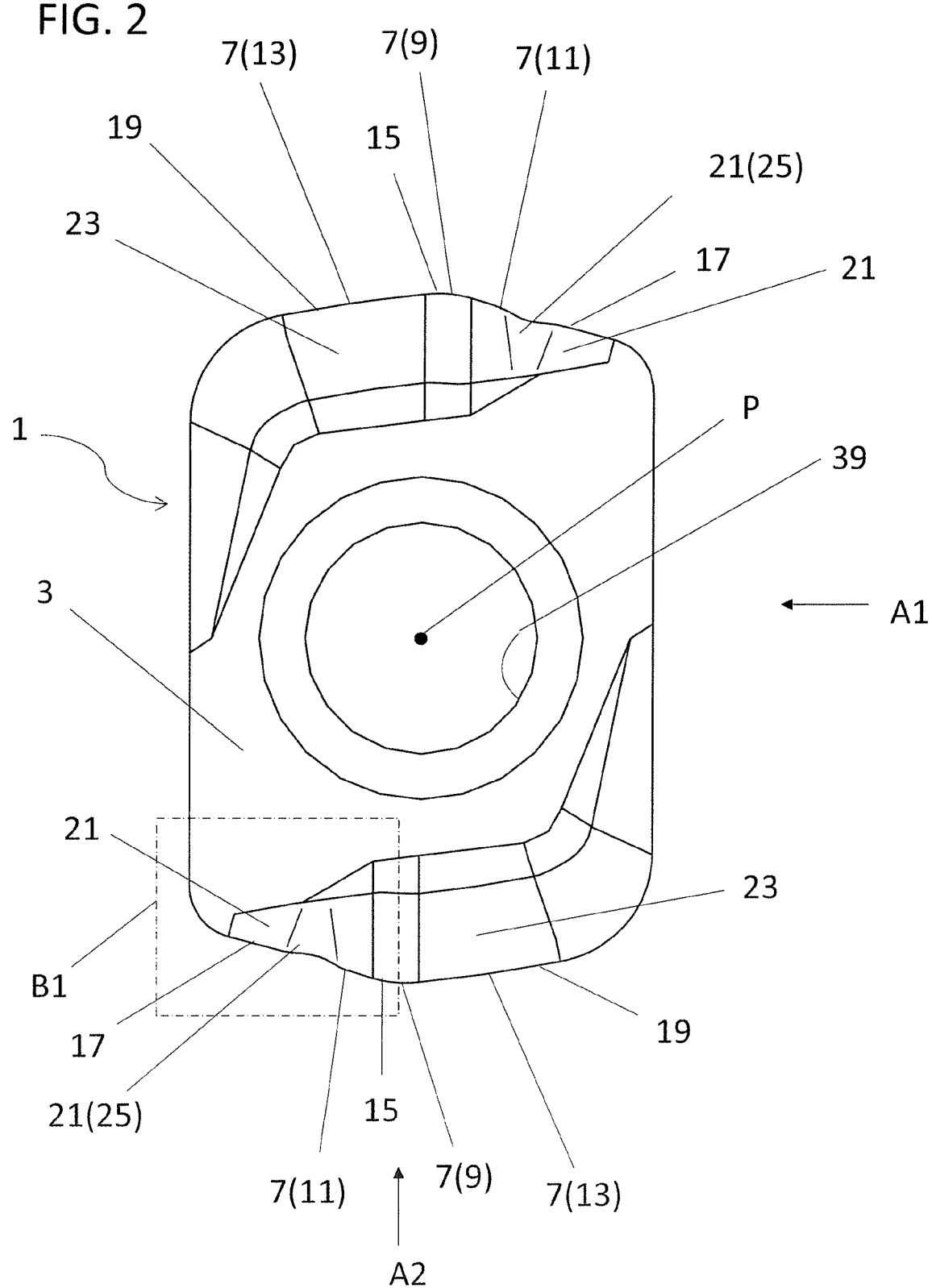
FIG. 2 is a front view of the cutting insert illustrated in FIG. 1 as viewed from a side of a first surface.
Figure 3:
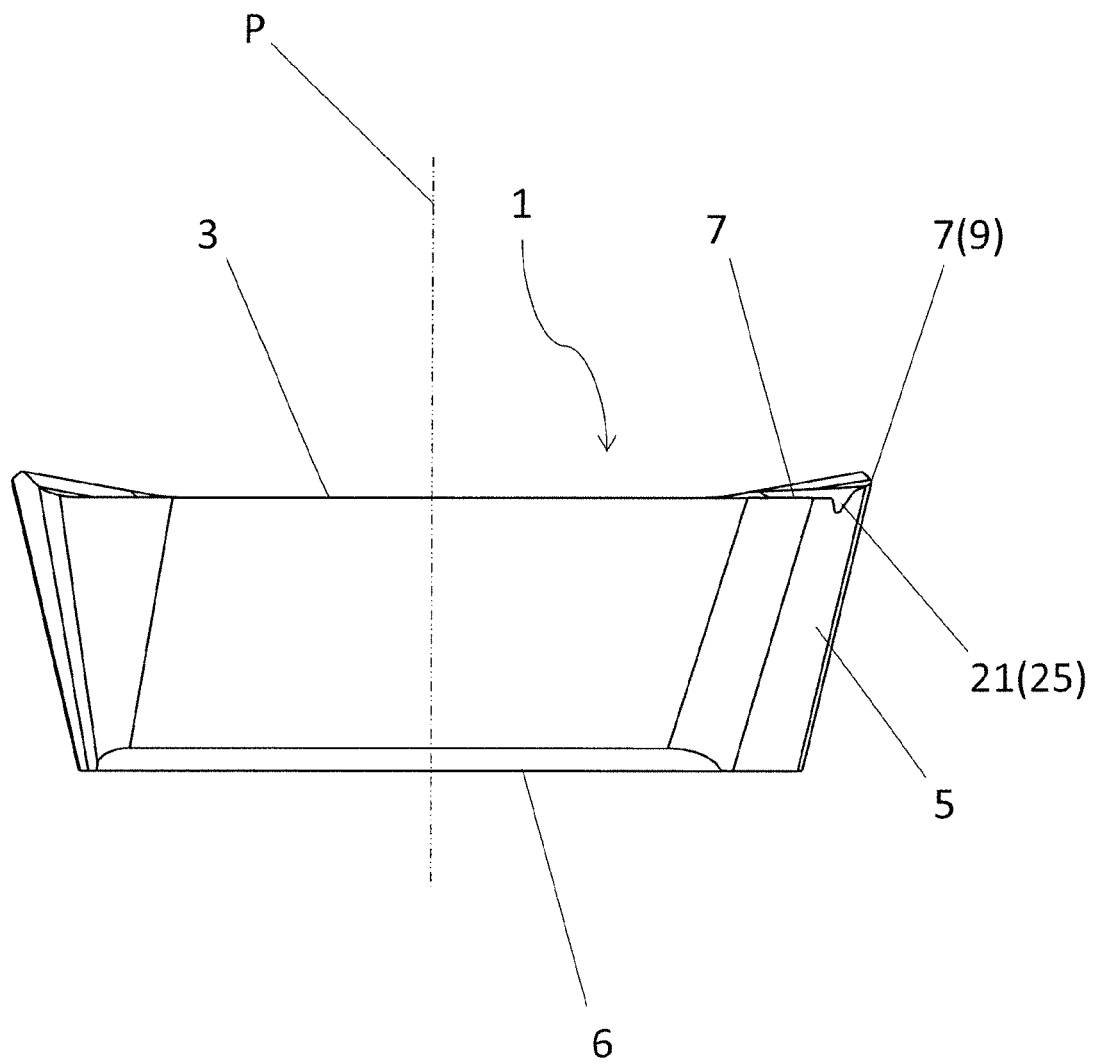
FIG. 3 is a side view of the cutting insert illustrated in FIG. 2 as viewed from direction A1.

As illustrated in FIG. 2, the first surface 3 may include a first corner 9, and a first side 11 and a second side 13 each extended from the first corner 9. The first corner 9 may be one of the six corners included in the first surface 3 in FIG. 2. The first side 11 and the second side 13 may be two of the six sides included in the first surface 3. The first corner 9 may be rephrased as a protruded part protruded in a direction away from a midportion of the first surface 3 in a front view of the first surface 3.

The first surface 3 may have an approximately polygonal shape and need not be a strict polygonal shape. Specifically, the sides in the first surface 3 having the polygonal shape need not have a strict straight line shape or, alternatively, these sides may have, for example, a convex curvilinear shape or concave curvilinear shape. The corners in the first surface 3 having the polygonal shape are not limited to a structure formed by intersection of two straight lines, but may have, for example, an outwardly rounded shape.

The shape of the first surface 3 is not limited to the above configuration. There is no problem even if the first surface 3 has a quadrangular shape, pentagonal shape or octagonal shape instead of the hexagonal shape. Dimensions of the insert 1 are not particularly limited. For example, a maximum width of the first surface 3 may be set to, approximately 3-20 mm. A height from the first surface 3 to the third surface 6 may be set to approximately 5-20 mm.

Alternatively, the insert 1 may include a hole 39 that opens into the first surface 3. The hole 39 may penetrate through the third surface 6 located on opposite side of the first surface 3. The hole 39 is not limited to the above embodiment but may open into the second surface 5. For example, the hole 39 may be configured to penetrate through the two planar regions located opposite sides on the second surface.

The hole 39 may be used as an insertion hole for a fixing tool when attaching the insert 1 to a holder. Examples of the fixing tool may include a screw and a wedge. Alternatively, the insert 1 may be fixed to the holder by using a brazing material.

The insert 1 may include a cutting edge located at least on a part of the ridge line 7 in a non-limiting embodiment. Specifically, the ridge line 7 may include a corner cutting edge 15 located on the first corner 9, a first cutting edge 17 located on at least a part of the first side 11, and a second cutting edge 19 located on at least the second side 13. The first cutting edge 17 may connect to the corner cutting edge 15. The second cutting edge 19 may connect to the corner cutting edge 15.

The first cutting edge 17 may be located on only the part or the whole of the first side 11. The second cutting edge 19 may be located on only the part or the whole of the second side 13. A so-called honing process may be applied to the corner cutting edge 15, the first cutting edge 17 and the second cutting edge 19. In other words, the ridge line 7 where the first surface 3 intersects with the second surface 5 may not be a strict line shape obtained by intersection of the two surfaces.

The first surface 3 may also include a first region 21 located from the first cutting edge 17 toward a midportion of the first surface 3, and a second region 23 located from the second cutting edge 19 toward the midportion of the first surface 3. The first region 21 and the second region 23 may serve as a rake surface.

The first surface 3 may include a concave part 25 located in at least one of the first region 21 and the second region 23. The first surface 3 may include the concave part 25 extended from a side of the ridge line 7 toward the midportion of the first surface 3 in FIGS. 1 to 6. FIGS. 1 to 6 may illustrate a non-limiting embodiment in which the concave part 25 is located in the first region 21.

The term "toward the midportion of the first surface 3" may denote "toward the midportion of the first surface 3 in a front view from the ridge line 7 of the first surface 3," but need not be strictly directed toward the midportion of the first surface 3 in a non-limiting embodiment.

With the insert 1 including the above configuration in a non-limiting embodiment, when chips generated by the part of the ridge line 7, which serves as the cutting edge during a cutting process, flow toward the midportion of the first surface 3, the chips may be bent upon contact with the concave part 25. The chips may be likely to be divided apart from a portion thus bent.

Figure 7:
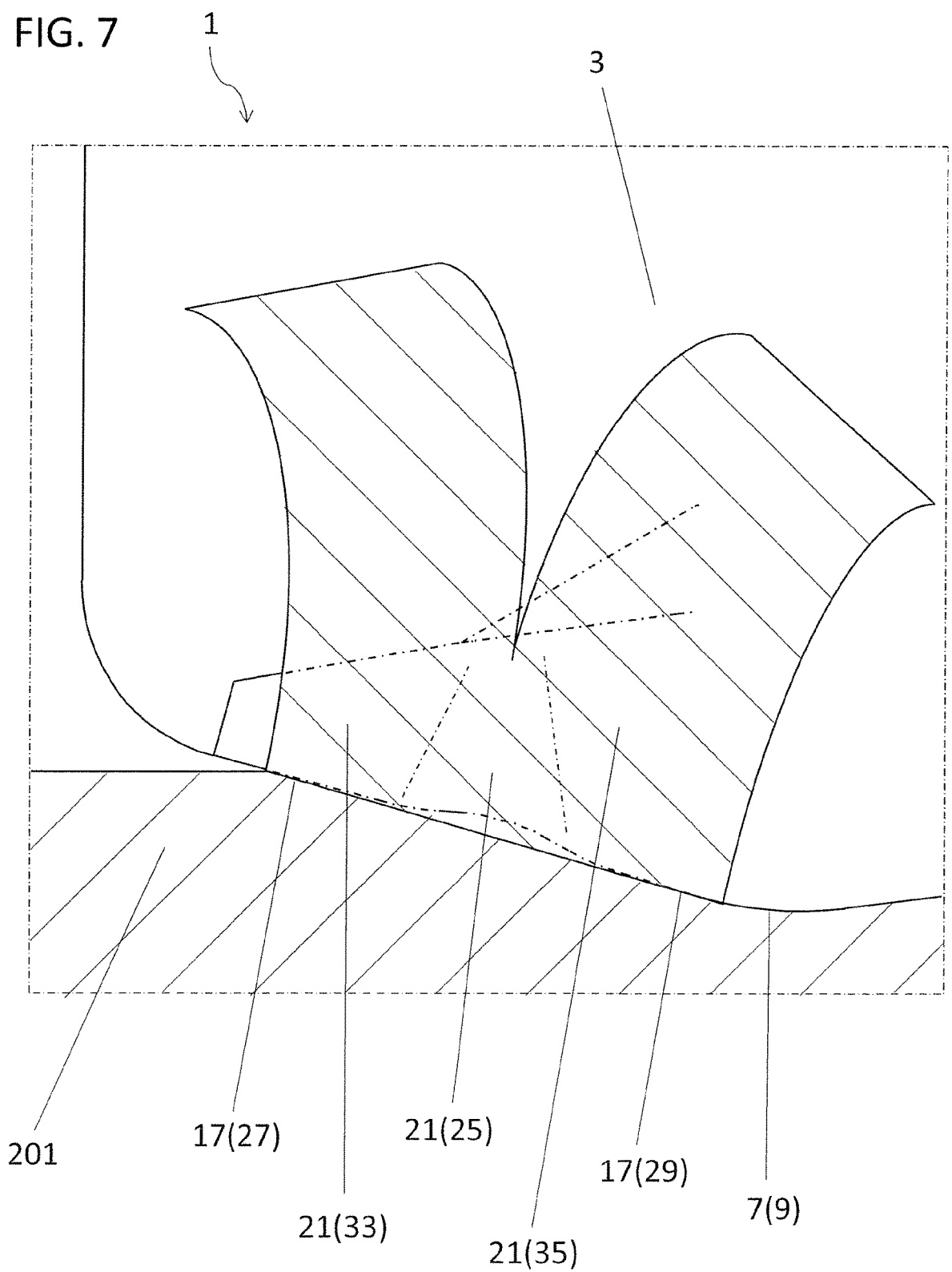
FIG. 7 is a conceptual diagram of a cutting process using the cutting insert illustrated in FIG. 1.

FIG. 7 may illustrate an example of how the chips are divided apart by the contact with the concave part 25. The chips may be divided apart along a chip extending direction in the example illustrated in FIG. 7. The chips so divided apart may have a small width. The chips having the small width may tend to be curled while being grazed on the first surface 3. The curled chips may tend to be well divided apart. The chips may be less likely to extend long because the chips are divided apart. This may make it easier for the chips to be discharged well. Chip clogging may be less likely to occur because of good chip discharge performance. Additionally, a machined surface is less susceptible to damage due to the chips.

Upon the contact with the concave part 25, chips may be divided apart in a direction orthogonal to the chip extending direction. This may be because the chips become less likely to be curled due to bending by the contact with the concave part 25. The chips less likely to be curled may further be bent in the direction orthogonal to the chip extending direction. The chips may tend to be divided apart from a bent portion in the direction orthogonal to the chip extending direction. In other words, the chips may be less likely to be curled and may be divided apart at short intervals in the chip extending direction. The chips thus divided in short lengths may tend to be discharged well.

If the concave part 25 is extended from the side of the ridge line 7 toward the midportion of the first surface 3, the concave part 25 may serve as a chip flow guide, thus leading to a better chip discharge.

No particular limitations may be imposed on a length N1 of the concave part 25 in a direction orthogonal to the first cutting edge 17 in cases where the concave part 25 is located in the first region 21. For example, a portion having a maximum length N1 may be expressed by 0.03 M1 to 0.24 M1 where M1 is a length of the first cutting edge 17.

Similarly, no particular limitations may be imposed on a length N2 of the concave part 25 in a direction orthogonal to the second cutting edge 19 in cases where the concave part 25 is located in the second region 23. For example, a portion having a maximum length N2 may be expressed by 0.03 M2 to 0.24 M2 where M2 is a length of the second cutting edge 19.

The concave part 25 may be located in one of the first region 21 and the second region 23. Alternatively, the concave part 25 may be located in both the first region 21 and the second region 23. The concave part 25 may be located in the first region 21 in a non-limiting embodiment illustrated in FIG. 2 as described above.

For example, the first cutting edge 17 on the ridge line 7 is capable of serving as an inner peripheral cutting edge, and the second cutting edge 19 on the ridge line 7 is capable of serving as an outer peripheral cutting edge. In this case, the second cutting edge 19 is usable mainly during a face milling process. In addition to the second cutting edge 19, the first cutting edge 17 is also usable during a ramping process.

In cases where the concave part 25 is located in the first region 21 as in a non-limiting embodiment illustrated in FIG. 2, good chip discharge performance is attainable.

Chips generated by the first cutting edge 17 serving as the inner peripheral cutting edge may be relatively thin, and therefore, a flow of the chips generated by the first cutting edge 17 may become unstable and may be liable to extend long. However, the chips generated by the first cutting edge 17 can be stably divided apart if the concave part 25 is located in the first region 21.

A good machined surface is obtainable if the concave part 25 is located in the second region 23. Chips generated by the second cutting edge 19 serving as the outer peripheral cutting edge may be relatively thick, and the machined surface is therefore susceptible to damage upon occurrence of chip clogging. However, the chips generated by the second cutting edge 19 can be stably divided apart if the concave part 25 is located in the second region 23. Consequently, the chip clogging may be less likely to occur, thus leading to the good machined surface.

The above effects are obtainable and the good chip discharge performance is attainable if the concave part 25 is located in both the first region 21 and the second region 23.

The concave part 25 may be located away from the ridge line 7, or alternatively, may include a part of the ridge line 7 as illustrated in FIG. 1 or the like. In other words, the concave part 25 may open into the second surface 5. In this case, the concave part 25 may extend from the ridge line 7 toward the midportion of the first surface 3.

Figure 4:
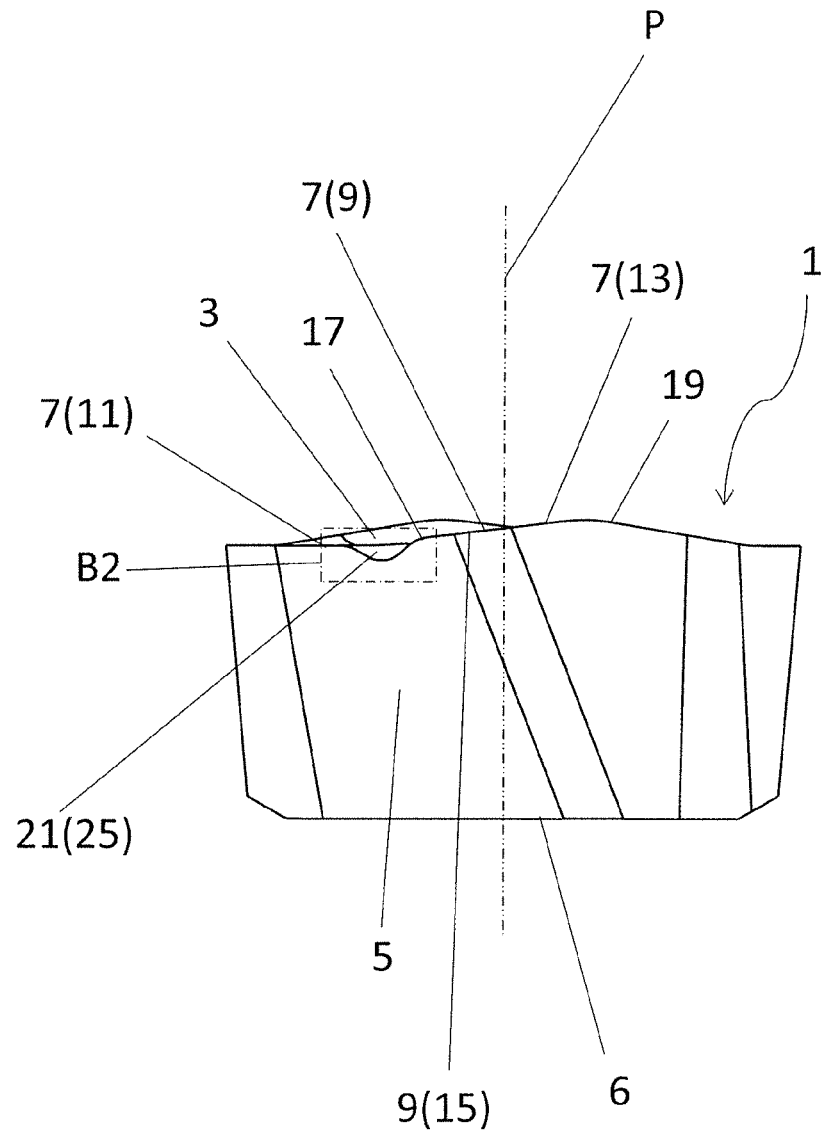
FIG. 4 is a side view of the cutting insert illustrated in FIG. 2 as viewed from direction A2.

In cases where the concave part 25 thus opens into the second surface 5, the first side 11 may have a concave shape in a front view of the second surface 5 as illustrated in FIG. 4, and therefore, the chips may tend to come into contact with the concave part 25. Consequently, the chips generated by the first cutting edge 17 may tend to be bent and divided apart.

Figure 5:
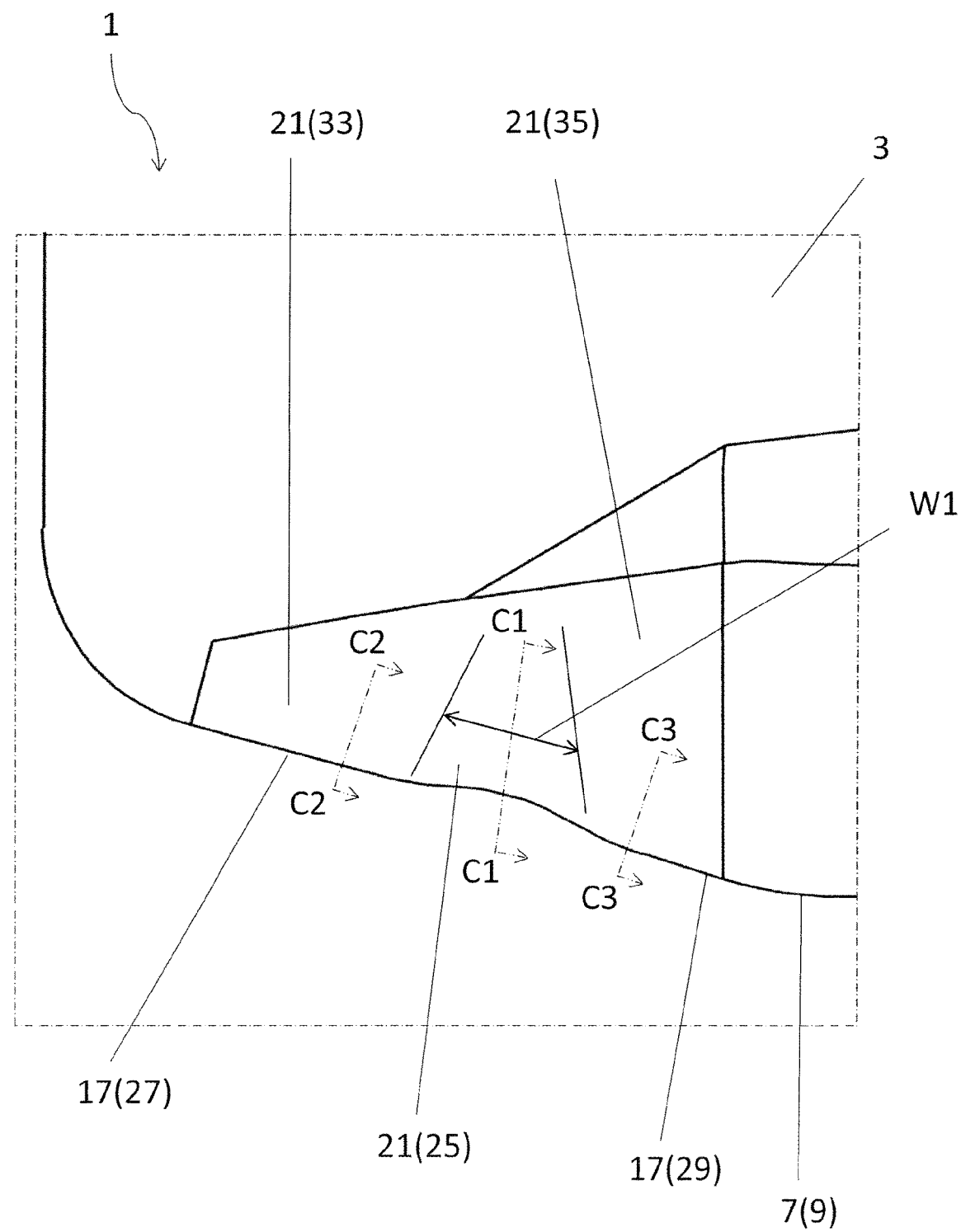
FIG. 5 is an enlarged view of a region B1 in FIG. 2.

The concave part 25 may include a part thereof whose width in a direction along the ridge line 7 becomes smaller as going away from the ridge line 7 in the front view of the first surface 3 as in a non-limiting embodiment illustrated in FIG. 5. Specifically, for example, if the concave part 25 is located in the first region 21, the concave part 25 may include a part thereof whose width W1 in a direction along the first cutting edge 17 becomes smaller as going away from the first cutting edge 17 in the front view of the first surface 3. Alternatively, the concave part 25 may be configured so that the width W1 becomes smaller as a whole as going away from the first cutting edge 17.

The chip discharge performance can be further enhanced if the concave part 25 is configured as described above. This may be because the chips can easily graze through the concave part 25 when being bent at the concave part 25. The chips may be therefore less likely to be accumulated in the concave part 25, thus leading to further enhanced chip discharge performance.

The length of the width W1 is not particularly limited. For example, a portion having a maximum length W1 may be expressed by 0.1 M1 to 0.8 M1 where M1 is a length of the first cutting edge 17.

Figure 8:
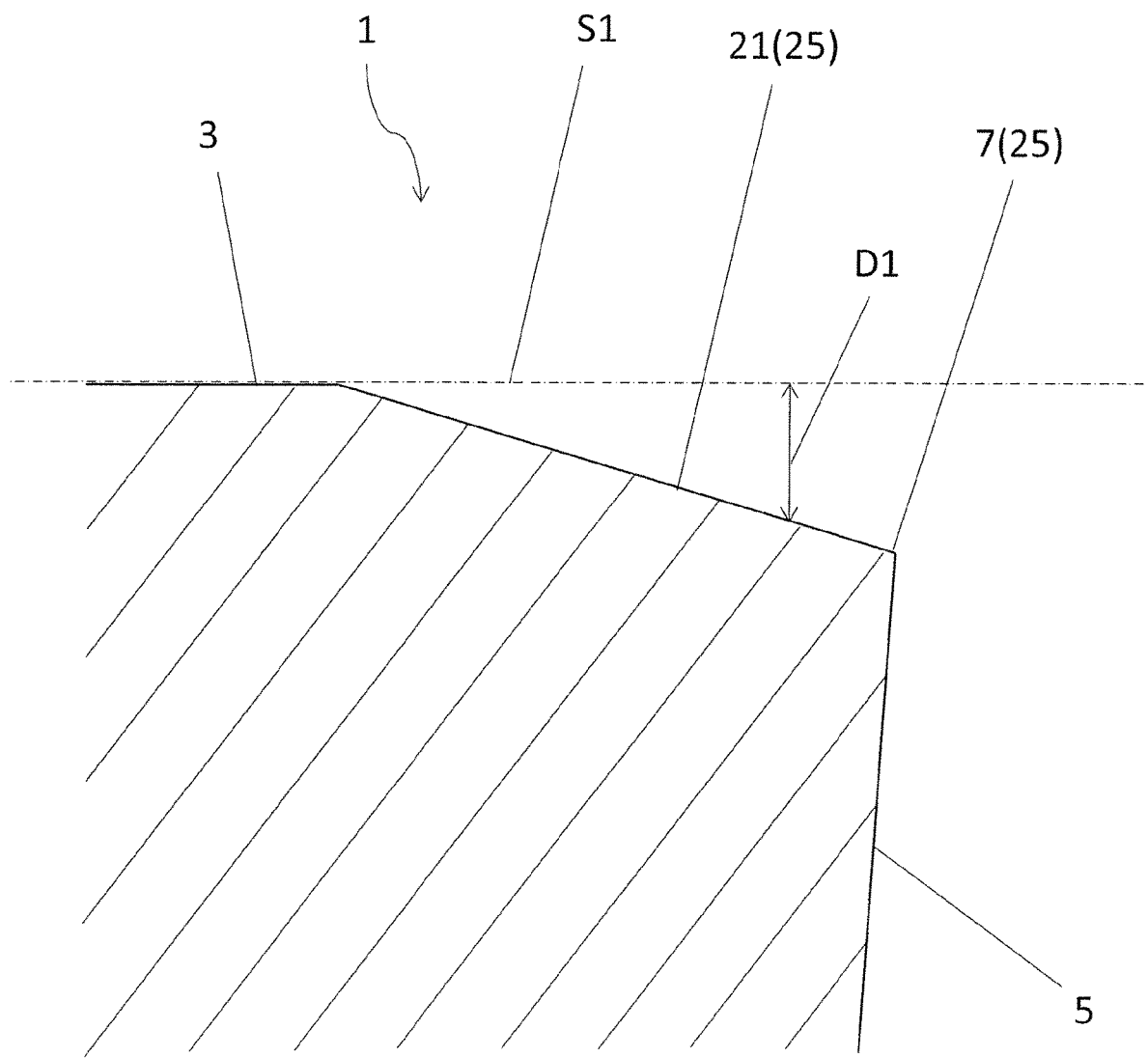
FIG. 8 is a sectional view taken along line C1-C1 in FIG. 5.

The concave part 25 may include a part that becomes shallower as going away from the ridge line 7 as in a non-limiting embodiment illustrated in FIG. 8. Further enhanced chip discharge performance is also attainable even if the concave part 25 is configured as described above. The chip discharge performance can be further enhanced because the chips are less likely to be accumulated in the concave part 25. The term "becoming shallower" may denote that a distance D1 between a bottom portion of the concave part 25 and a reference plane S1 orthogonal to a central axis P of the insert 1 becomes smaller as going away from the ridge line 7.

Although the bottom portion of the concave part 25 continuously becomes shallower in a non-limiting embodiment illustrated in FIG. 8, it may not be intended to limit to this embodiment. The concave part 25 may include a part thereof where the distance between the bottom portion of the concave part 25 and the reference plane S1 is constant.

The length of the distance D1 is not particularly limited. For example, a portion having a maximum distance D1 may be expressed by 0.01 M1 to 0.4 M1 where M1 is the length of the first cutting edge 17.

In cases where the concave part 25 opens into the second surface 5, the ridge line located on both sides of the concave part 25 may correspond to a first ridge line 27 and a second ridge line 29, a part of the first surface 3 which is located from the first ridge line 27 toward the midportion of the first surface 3 may be a third region 33, and a part of the first surface 3 which is located from the second ridge line 29 toward the midportion of the first surface 3 may be a fourth region 35. The third region 33 and the fourth region 35 may serve as a rake surface.

In a non-limiting embodiment illustrated in FIG. 5, a part of the first cutting edge 17 which is located more away from the first corner 9 than the concave part 25 may correspond to the first ridge line 27. A part of the first cutting edge 17 which is located closer to the first corner 9 than the concave part 25 may correspond to the second ridge line 29. A part of the first region 21 which is located along the first ridge line 27 may correspond to the third region 33. A part of the first region 21 which is located along the second ridge line 29 may correspond to the fourth region 35.

Figure 9:
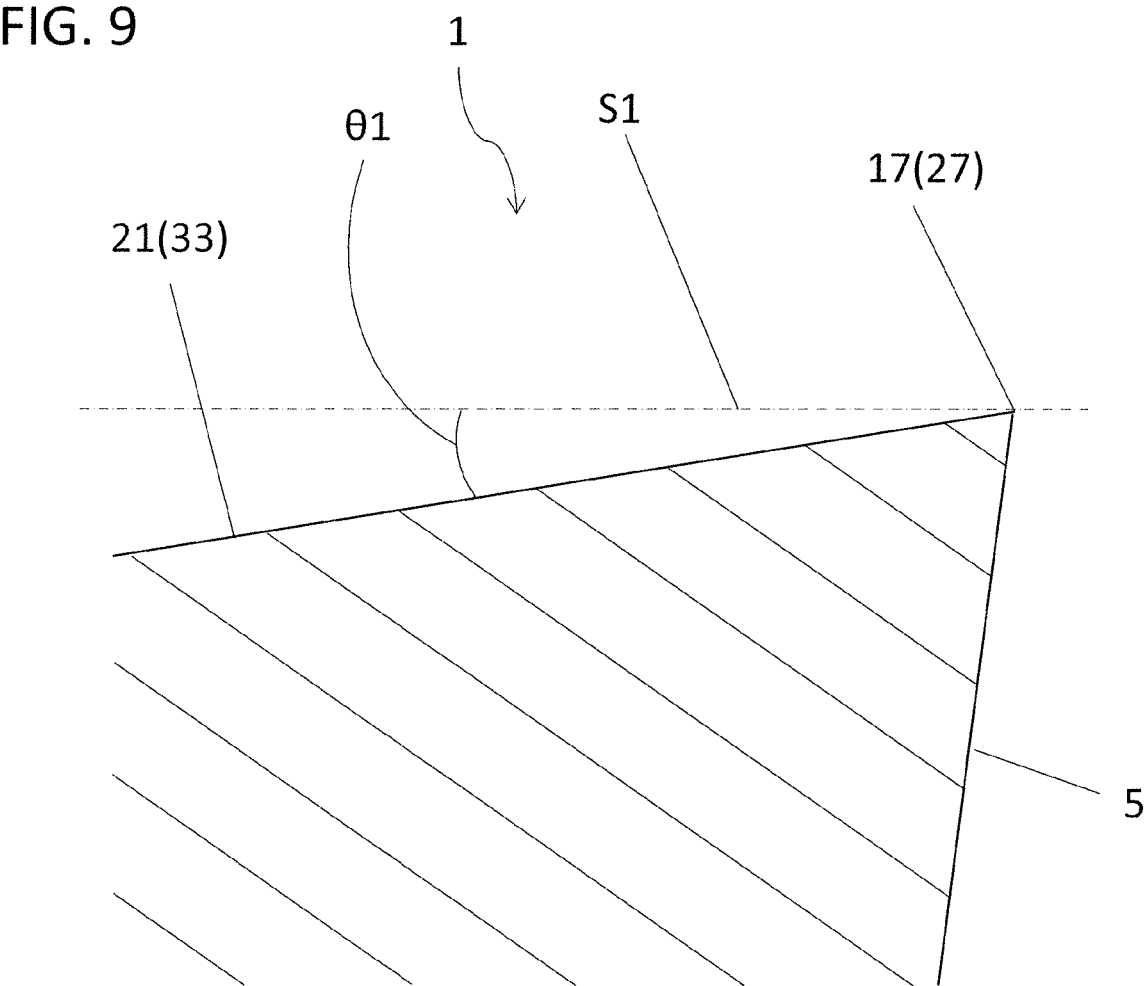
FIG. 9 is a sectional view taken along line C2-C2 in FIG. 5.
Figure 10:
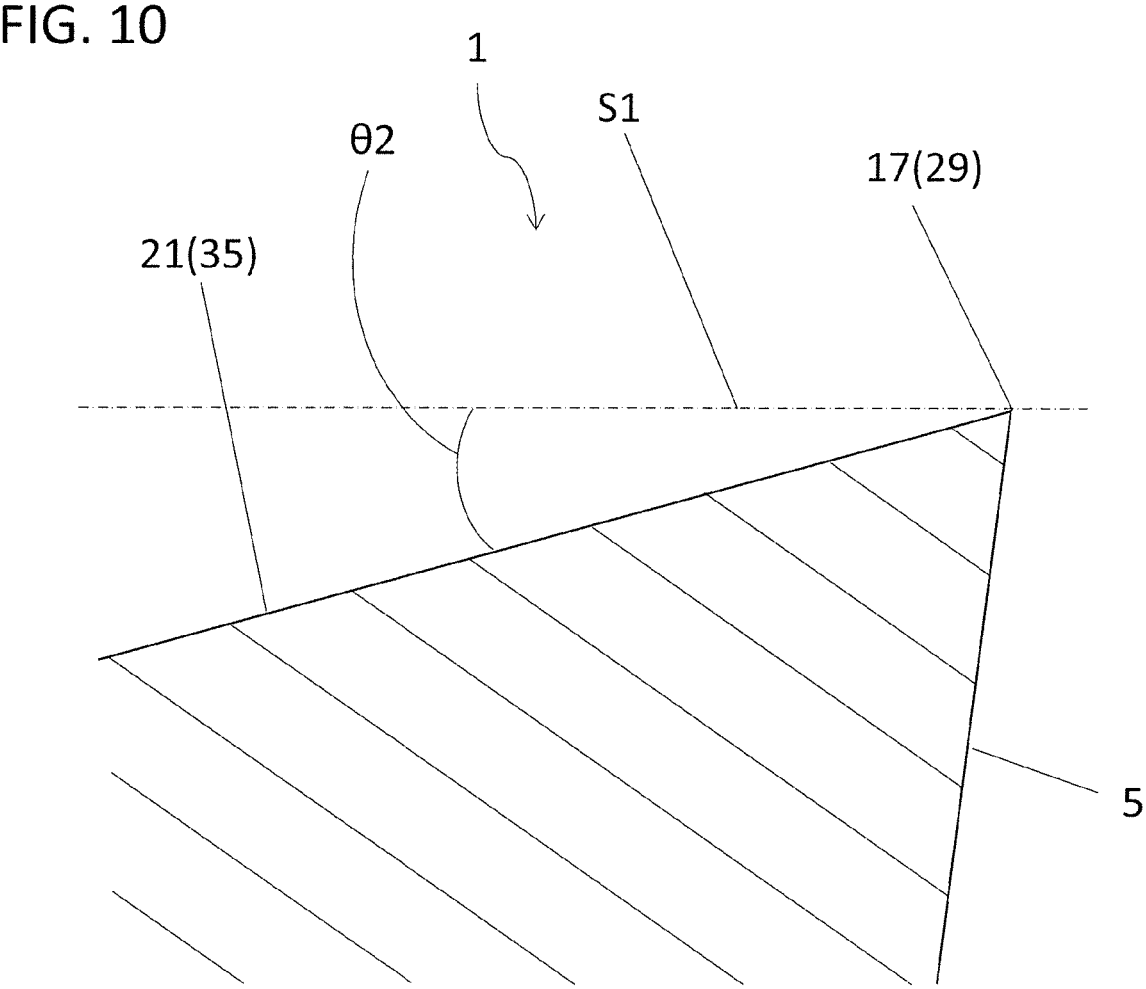
FIG. 10 is a sectional view taken along line C3-C3 in FIG. 5.

An angle formed by the third region 33 and the reference plane S2 orthogonal to the central axis P of the insert 1 may be a first angle $\theta 1$. An angle formed by the reference plane S1 and the fourth region 35 may be a second angle $\theta 2$. A value of the first angle $\theta 1$ may be identical with or different from a value of the second angle $\theta 2$. The second angle $\theta 2$ may be larger than the first angle $\theta 1$ in a non-limiting embodiment illustrated in FIGS. 9 and 10.

If the first angle $\theta 1$ is different from the second angle $\theta 2$, a part of chips which flows through the third region 33 may be different from the other part flowing through the fourth region 35 in chip flow velocity. Accordingly, the part of the chip bent by the concave part 25 may tend to be easily divided apart due to velocity differences between chips flowing through the third region 33 and the chips flowing through the fourth region 35.

In a front view of the second surface 5, the first ridge line 27 and the second ridge line 29 may be located on an imaginary straight line. Alternately, an imaginary extension line L1 of the first ridge line 27 may intersect with an imaginary extension line L2 of the second ridge line 29 as in a non-limiting embodiment illustrated in FIG. 6.

Figure 6:
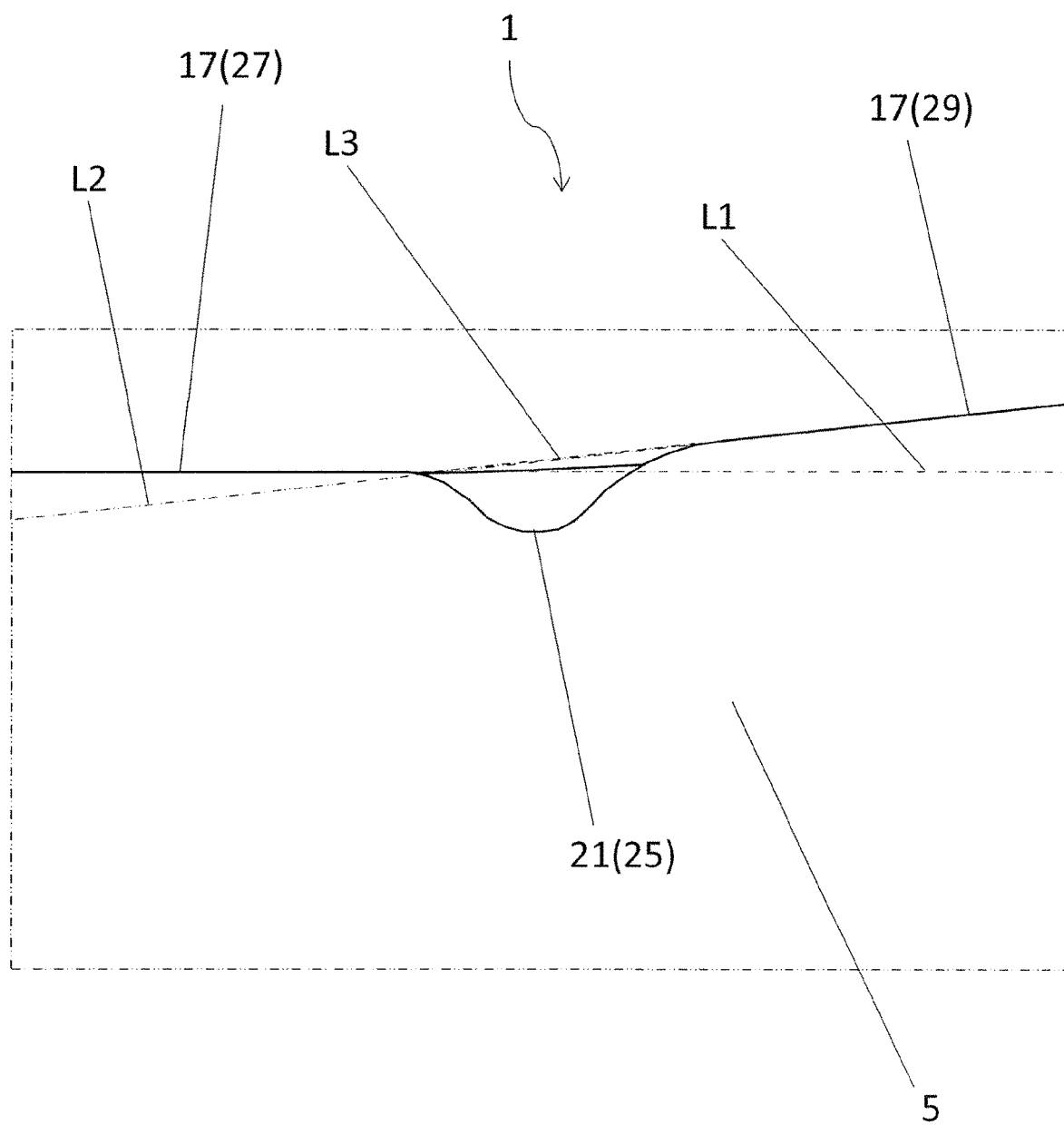
FIG. 6 is an enlarged view of a region B2 in FIG. 4.

A portion indicated by an imaginary straight line L3 that connects an intersection point of the concave part 25 and the first ridge line 27 and an intersection point of the concave part 25 and the second ridge line 29 may be an opening of the concave part 25 in the front view of the second surface 5. If the imaginary extension line L1 is located closer to the bottom portion of the concave part 25 than the opening as illustrated in FIG. 6, a ridge portion where the concave 25 intersects with the first ridge line 27 may have a large angle, and a large cutting load may be therefore less likely to be concentrated at the ridge part. Consequently, the insert 1 may be less subject to fractures, thus leading to enhanced durability of the insert 1.

Figure 11:
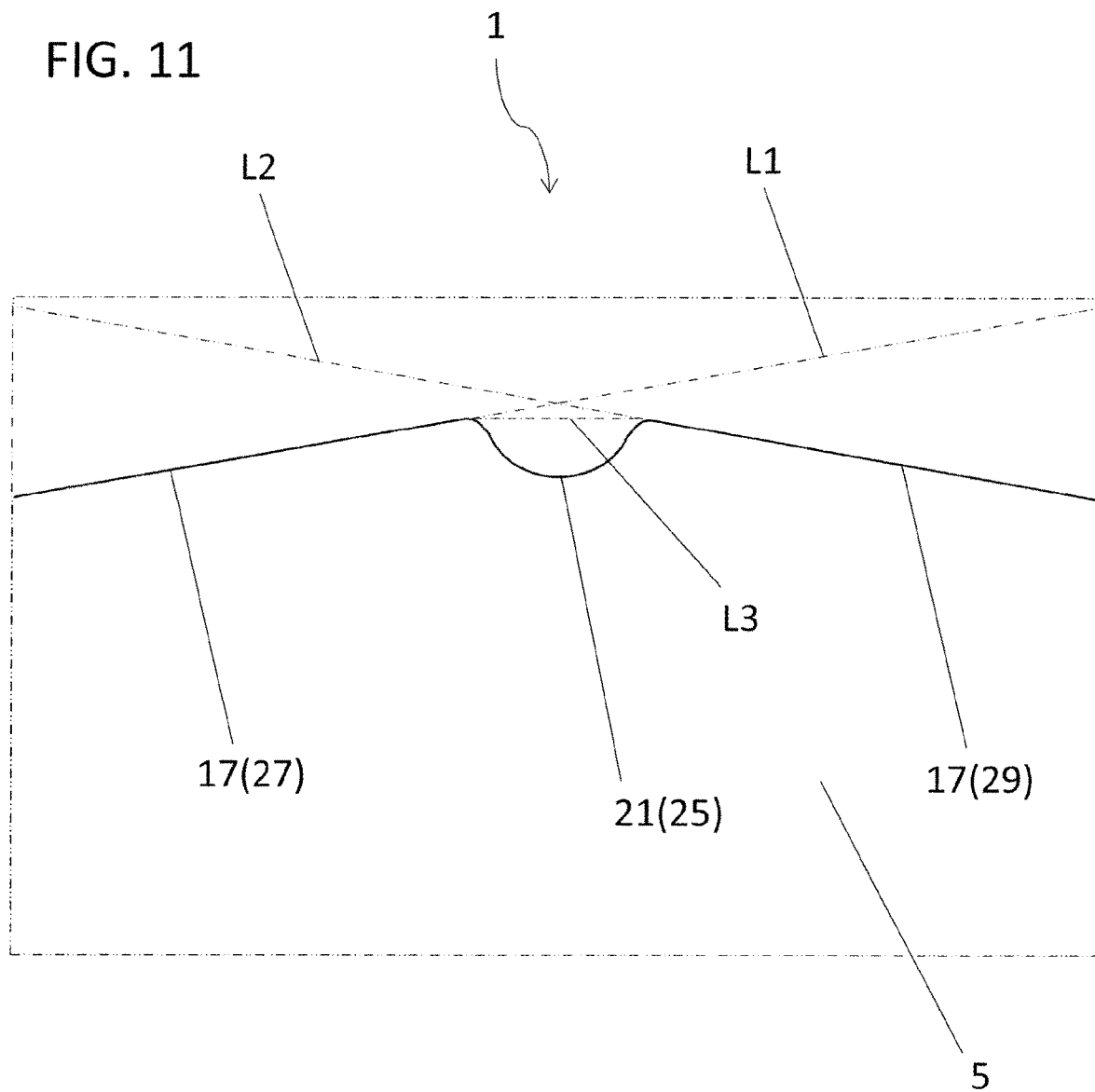
FIG. 11 is an enlarged view of a cutting insert in a non-limiting embodiment.

If the imaginary extension line L1 is located further away from the bottom portion of the concave part 25 than the opening as illustrated in FIG. 11, a ridge portion where the concave 25 intersects with the first ridge line 27 may have a small angle. Hence, the part of the chips which flows through the third region 33 may be more likely to be bent than the part of the chips which flows through the concave 25. The chips may be therefore more likely to be divided apart. FIG. 11 may be an enlarged view of a region corresponding to FIG. 6 in the inert 1 in a non-limiting embodiment.

If the imaginary extension line L2 is located further away from the bottom portion of the concave part 25 than the opening as illustrated in FIG. 11, a ridge portion where the concave 25 intersects with the second ridge line 29 may have a small angle. Hence, the part of the chips which flows through the fourth region 35 may be more likely to be bent than the part of the chips which flows through the concave 25. The chips may be therefore more likely to be divided apart.

If the imaginary extension line L2 is located closer to the bottom portion of the concave part 25 than the opening, a ridge portion where the concave 25 intersects with the second ridge line 29 may have a large angle. Hence, a large cutting load may be less likely to be concentrated at the ridge part. The insert 1 may be therefore less subject to fractures, thus leading to enhanced durability of the insert 1.

In a non-limiting embodiment illustrated in FIG. 11, the imaginary extension line L1 intersects with the imaginary extension line L2, and the imaginary extension line L1 and the imaginary extension line L2 may be located further away from the bottom portion of the concave part 25 than the opening. In this case, chips may be more likely to be divided apart, thus leading to more improved chip discharge performance.

A length of the first ridge line 27 and a length of the second ridge line 29 are not limited to a specific value. For example, the first ridge line 27 may have the same length as the second ridge line 29, or alternatively, the length of the first ridge line 27 may be different from the length of the second ridge line 29.

For example, cemented carbide or cermet is usable as a material of the insert 1. Examples of composition of the cemented carbide may include WC—Co, WC—TiC—Co and WC—TiC—TaC—Co. The WC—Co may be produced by adding cobalt (Co) powder to tungsten carbide (WC), followed by sintering. The WC—TiC—Co may be produced by adding titanium carbide (TiC) to WC—Co. The WC—TiC—TaC—Co may be produced by adding tantalum carbide (TaC) to WC—TiC—Co.

The cermet may be a sintered composite material obtainable by compositing metal into a ceramic component. Examples of the cermet may include ones which are composed mainly of a titanium compound, such as titanium carbide (TiC) or titanium nitride (TiN).

A surface of the insert 1 may be coated with a coating film by using a chemical vapor deposition (CVD) method or a physical vapor deposition (PVD) method. Examples of composition of the coating film may include titanium carbide (TiC), titanium nitride (TiN), titanium carbonitride (TiCN) and alumina ($Al_2O_3$).

Another cutting insert 1' in a non-limiting embodiment may be described below with reference to the drawings. The following description of the insert 1' may be focused on differences from the insert 1. Therefore, the insert 1' may include configurations similar to those in the insert 1. Descriptions of the similar configurations may be omitted in some cases.

Figure 12:
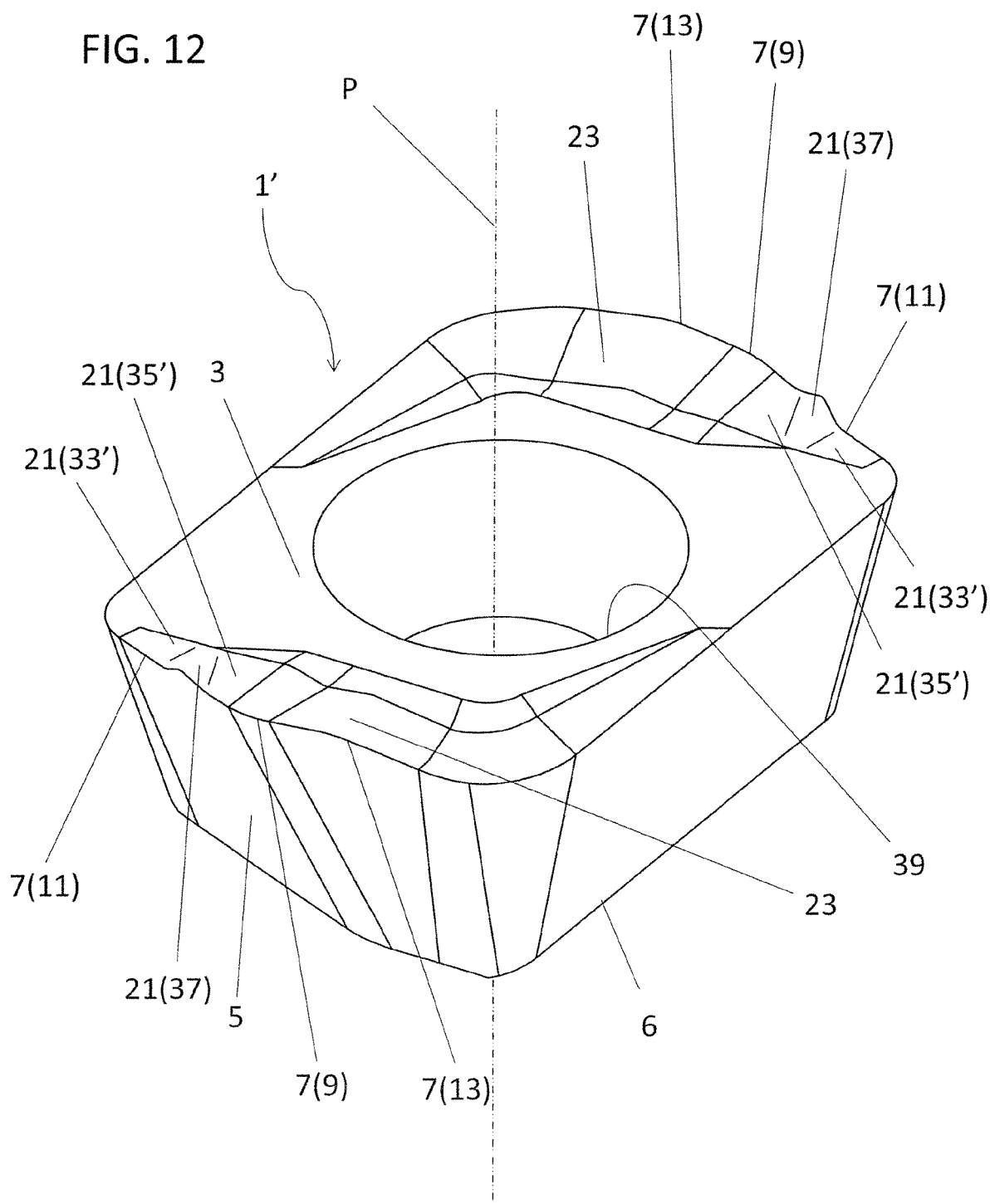
FIG. 12 is a perspective view illustrating a cutting insert in a non-limiting embodiment.

As illustrated in FIG. 12, the insert 1' in a non-limiting embodiment may include a first surface 3 (an upper surface in FIG. 12), a second surface 5 (a side surface in FIG. 12), and a ridge line 7 where the first surface 3 intersects with the second surface 5. The first surface 3 may have a polygonal shape, and the first surface 3 may have an approximately hexagonal shape in a non-limiting embodiment illustrated in FIG. 13. Accordingly, the first surface 3 may include six corners and six sides.

Figure 13:
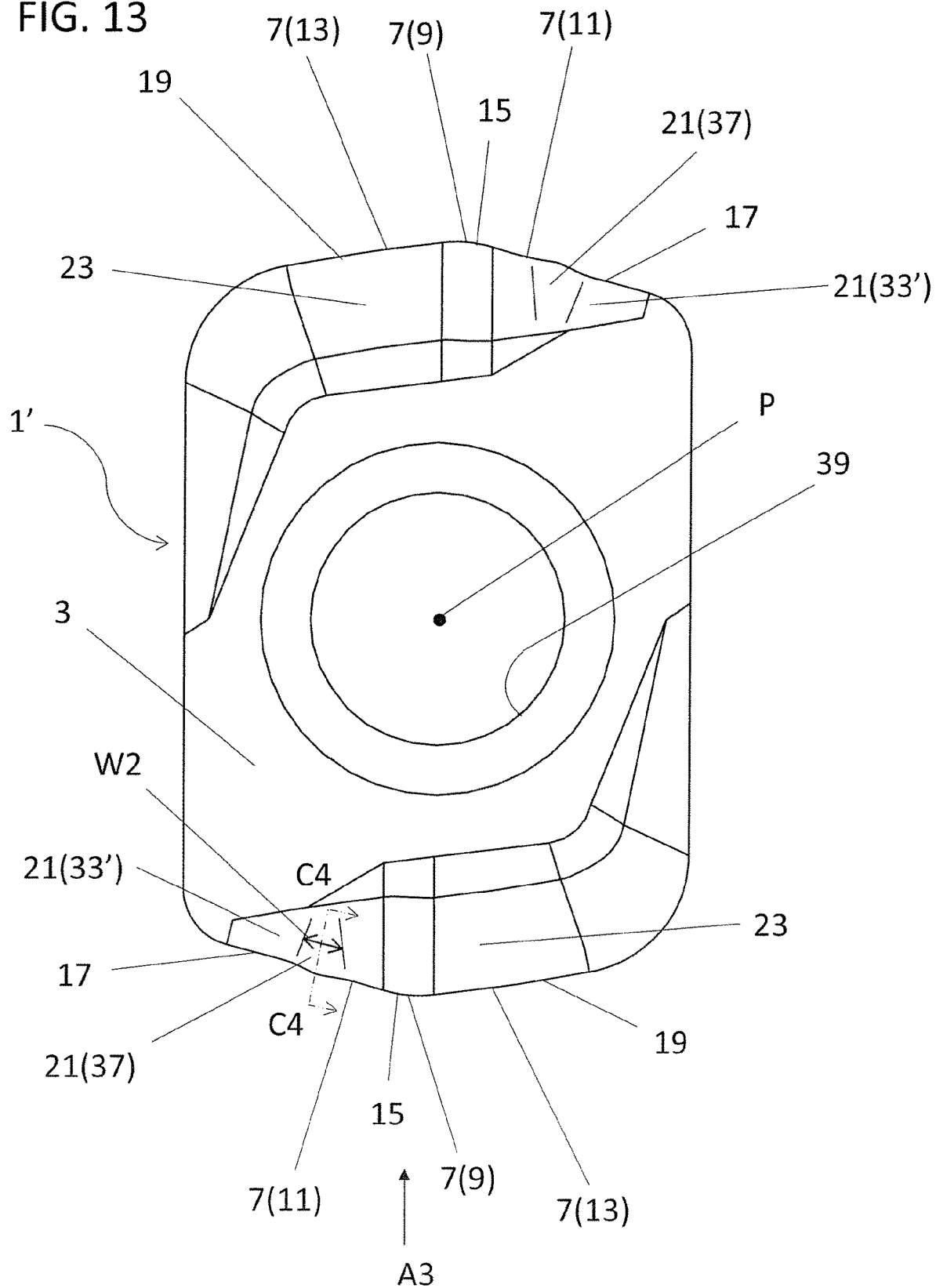
FIG. 13 is a front view of the cutting insert illustrated in FIG. 12 as viewed from a side of a first surface.

As illustrated in FIG. 13, the first surface 3 may include a first corner 9, and a first side 11 and a second side 13 each extended from the first corner 9. The first corner 9 may be one of the six corners included in the first surface 3 in FIG. 13. The first side 11 and the second side 13 may be two of the six sides included in the first surface 3.

The first surface 3 may have an approximately polygonal shape and need not be a strict polygonal shape. Specifically, the sides in the first surface 3 having the polygonal shape need not have a strict straight line shape or, alternatively, these sides may have, for example, a convex curvilinear shape or concave curvilinear shape. The corners in the first surface 3 having the polygonal shape are not limited to a structure formed by intersection of the two straight lines, but may have, for example, an outwardly rounded shape.

The shape of the first surface 3 is not limited to the above configuration. There is no problem even if the first surface 3 has a quadrangular shape, pentagonal shape or octagonal shape instead of the hexagonal shape.

The insert 1' of a non-limiting embodiment may include a cutting edge located on at least a part of the ridge line 7 in a non-limiting embodiment. Specifically, the ridge line 7 may include a corner cutting edge 15 located on the first corner 9, a first cutting edge 17 located on at least a part of the first side 11, and a second cutting edge 19 located on at least the second side 13.

The first cutting edge 17 may be located on only the part or the whole of the first side 11. The second cutting edge 19 may be located on only the part or the whole of the second side 13. A so-called honing process may be applied to the corner cutting edge 15, the first cutting edge 17 and the second cutting edge 19. In other words, the ridge line 7 where the first surface 3 intersects with the second surface 5 may not be a strict line shape obtained by intersection of the two surfaces.

The first surface 3 may also include a first region 21 located from the first cutting edge 17 toward a midportion of the first surface 3, and a second region 23 located from the second cutting edge 19 toward the midportion of the first surface 3. The first region 21 and the second region 23 may serve as a rake surface.

Figure 14:
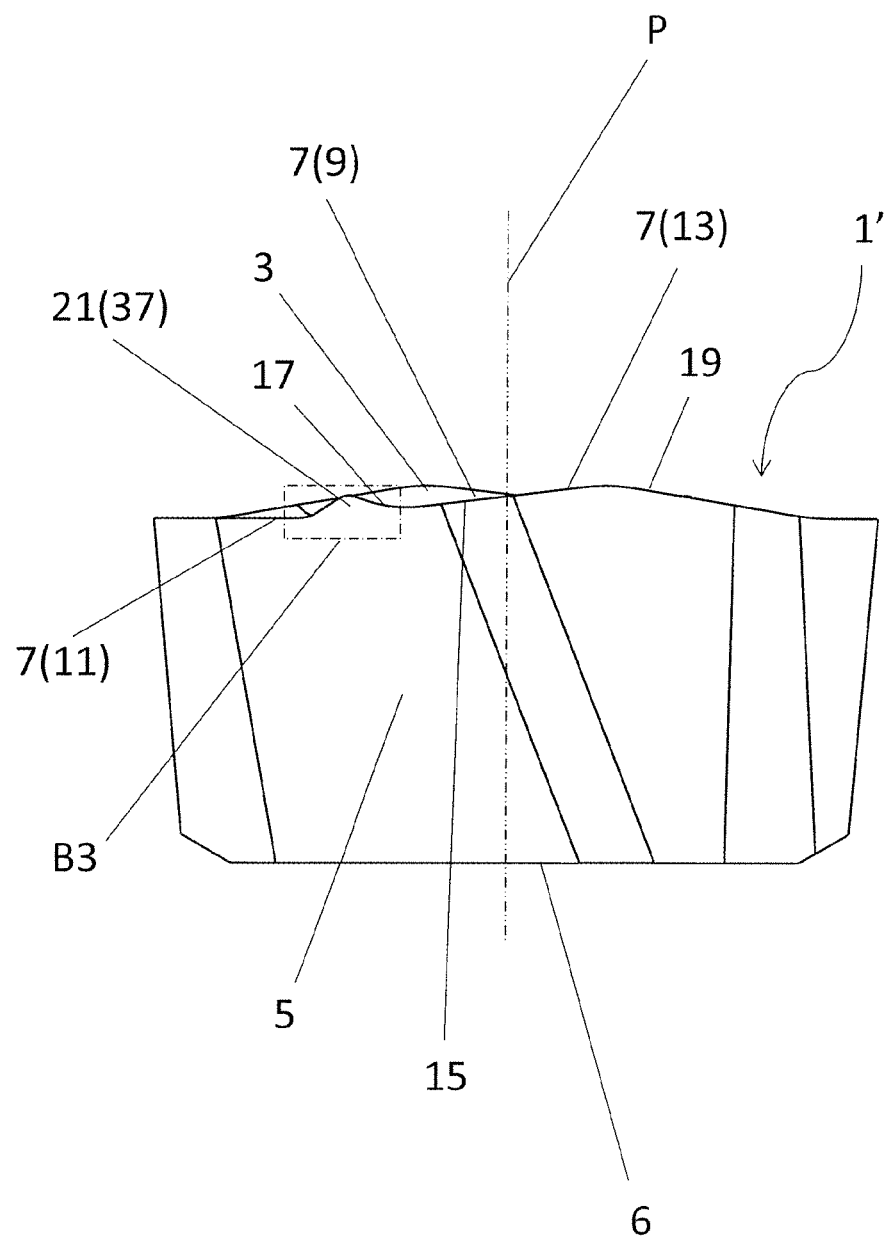
FIG. 14 is a side view of the cutting insert illustrated in FIG. 13 as viewed from A3 direction.

The first surface 3 may include a convex part 37 located in at least one of the first region 21 and the second region 23. The first surface 3 may include the convex part 37 extended from a side of the ridge line 7 toward the midportion of the first surface 3 in FIGS. 12 to 14. In short, the insert 1 may include the concave part 25 in the above embodiment, while the insert 1' may include the convex part 37 in a non-limiting embodiment as a configuration corresponding to the concave part 25. FIGS. 12 to 14 may illustrate a non-limiting embodiment in which the convex part 37 is located in the first region 21.

With the insert 1' including the convex part 37 in a non-limiting embodiment, when chips generated by the part of the ridge line 7 which serves as the cutting edge flow toward the midportion of the first surface 3 during a cutting process, the chips may be bent upon contact with the convex part 37. The chips may be likely to be divided apart from a portion thus bent.

In an example of how the chips are divided apart by the contact with the convex part 37, the chips may be divided apart along a chip extending direction. The chips so divided apart may have a small width. The chips having the small width may tend to be curled while being grazed on the first surface 3. The curled chips may tend to be well divided apart. The chips may be less likely to extend long because the chips are divided apart. This may lead to good discharge of the chips. Chip clogging may be less likely to occur because of good chip discharge performance. Additionally, a machined surface is less susceptible to damage due to the chips.

Upon the contact with the convex part 37, chips may be divided apart in a direction orthogonal to the chip extending direction. This may be because the chips become less likely to be curled due to bending by the contact with the convex part 37. The chips less likely to be curled may further be bent in the direction orthogonal to the chip extending direction. The chips may tend to be divided apart from a bent portion in the direction orthogonal to the chip extending direction. In other words, the chips may be less likely to be curled and may be divided apart at short intervals in the chip extending direction. Thus, the chips thus divided in short lengths may tend to be discharged easily.

If the convex part 37 is extended from a side of the ridge line 7 toward the midportion of the first surface 3, the convex part 37 may serve as a chip flow guide, thereby contributing to a better chip discharge.

No particular limitations may be imposed on a length N3 of the convex part 37 in a direction orthogonal to the first cutting edge 17 in cases where the convex part 37 is located in the first region 21. For example, a portion having a maximum length N3 may be expressed by 0.03 M1 to 0.24 M1 where M1 is a length of the first cutting edge 17.

Similarly, no particular limitations may be imposed on a length N4 of the convex part 37 in a direction orthogonal to the second cutting edge 19 in cases where the convex part 37 is located in the second region 23. For example, a portion having a maximum length N4 may be expressed by 0.03 M2 to 0.24 M2 where M2 is a length of the second cutting edge 19.

The convex part 37 may be located in one of the first region 21 and the second region 23. Alternatively, the convex part 37 may be located in both the first region 21 and the second region 23. The convex part 37 may be located in the first region 21 in a non-limiting embodiment illustrated in FIG. 13 as described above.

For example, the first cutting edge 17 on the ridge line 7 is capable of serving as an inner peripheral cutting edge, and the second cutting edge 19 on the ridge line 7 is capable of serving as an outer peripheral cutting edge. In this case, the second cutting edge 19 is usable mainly during a face milling process. In addition to the second cutting edge 19, the first cutting edge 17 is also usable during a ramping process.

In cases where the convex part 37 is located in the first region 21 as in a non-limiting embodiment illustrated in FIG. 13, good chip discharge performance is attainable.

Chips generated by the first cutting edge 17 serving as the inner peripheral cutting edge may be relatively thin, and therefore, a flow of the chips generated by the first cutting edge 17 may become unstable and may be liable to extend long. However, the chips generated by the first cutting edge 17 can be stably divided apart if the convex part 37 is located in the first region 21.

A good machined surface is obtainable if the convex part 37 is located in the second region 23. Chips generated by the second cutting edge 19 serving as the outer peripheral cutting edge may be relatively thick, and the machined surface is therefore susceptible to damage upon occurrence of chip clogging. However, the chips generated by the second cutting edge 19 can be stably divided apart if the convex part 37 is located in the second region 23. Consequently, the chip clogging may be less likely to occur, thus leading to the good machined surface.

The above effects may be obtainable and the good chip discharge performance is attainable if the concave part 25 is located in both the first region 21 and the second region 23.

The convex part 37 may be located away from the ridge line 7, or alternatively, may include a part of the ridge line 7 as illustrated in FIG. 12. If the convex part 37 includes the part of the ridge line 7, the first cutting edge 17 may have a convex shape in the front view of the second surface 5. In this case, the convex part 37 may extend from the ridge line 7 toward the midportion of the first surface 3.

In cases where the convex part 37 is thus in contact with the ridge line 7, the first side 11 may have a convex shape in the front view of the second surface 5, and therefore, chips may tend to come into contact with the convex part 37. Consequently, the chips generated by the first cutting edge 17 may tend to be bent and divided apart.

The convex part 37 may include a part thereof whose width in a direction along the ridge line 7 becomes smaller as going away from the ridge line 7 in the front view of the first surface 3 as illustrated in FIG. 13. Specifically, for example, if the convex part 37 is located in the first region 21, the convex part 37 may include a part thereof whose width W2 in a direction along the first cutting edge 17 becomes smaller as going away from the first cutting edge 17 in the front view of the first surface 3. Alternatively, the convex part 37 may be configured so that the width W2 becomes smaller as a whole as going away from the first cutting edge 17.

In cases where the convex part 37 includes the above configuration, stress concentration at a part of the convex part 37 which is in contact with the ridge line 7 can be relaxed to improve durability of the convex part 37.

The length of the width W2 is not particularly limited. For example, a portion having a maximum length W1 may be expressed by 0.1 M1 to 0.8 M1 where M1 is a length of the first cutting edge 17.

Figure 15:
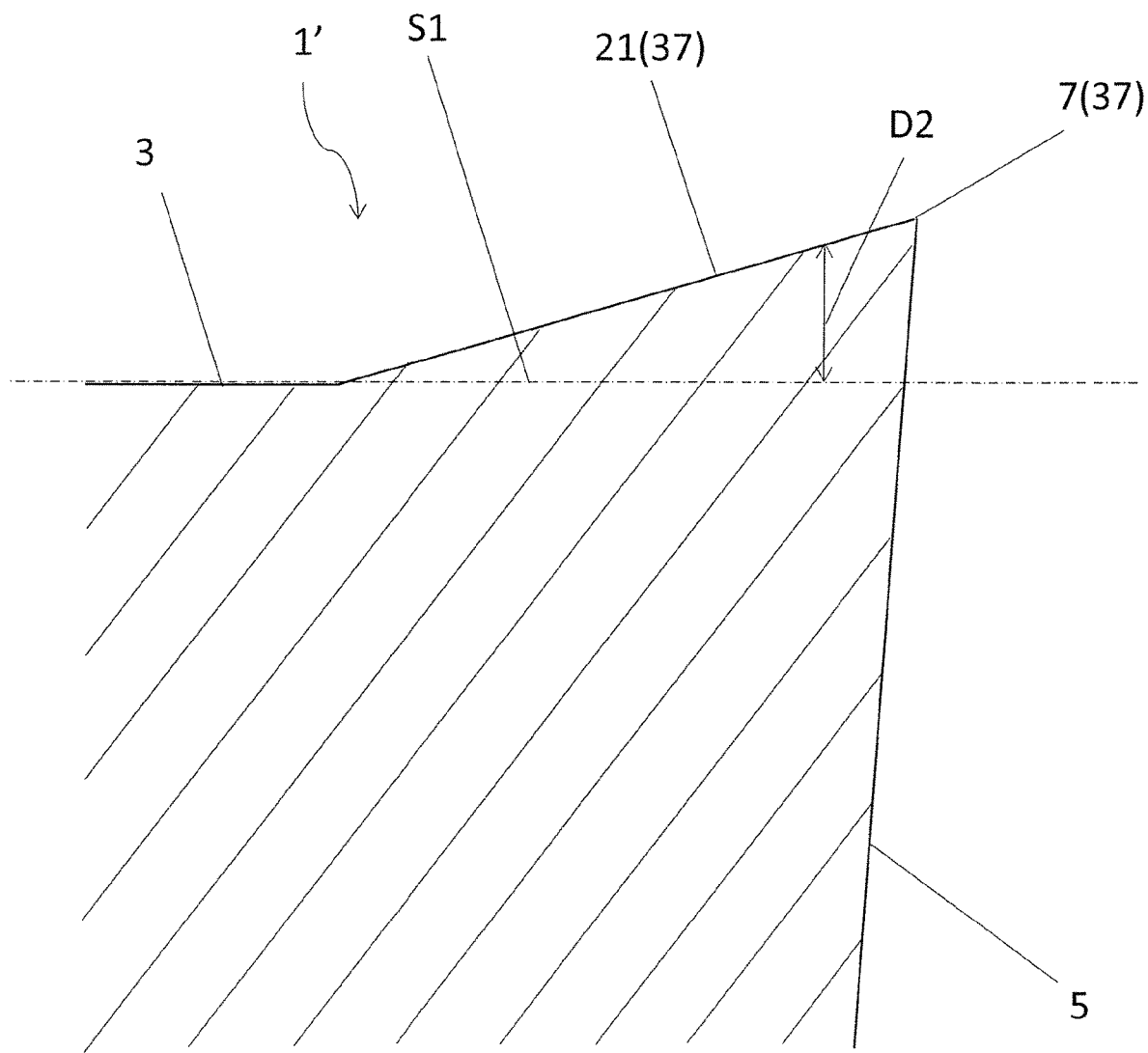
FIG. 15 is a sectional view taken along line C4-C4 in FIG. 13.

The convex part 37 may include a part thereof where a height of the convex part 37 becomes smaller as going away from the ridge line 7 as illustrated in FIG. 15. Further enhanced chip discharge performance is also attainable even if the convex part 37 is configured as described above. The chip discharge performance can be further enhanced because the chips are less likely to be accumulated in the convex part 37. The phrase "height becomes smaller" may denote that a distance D2 between a top portion of the convex part 37 and the reference plane S1 orthogonal to the central axis P of the insert becomes smaller as going away from the ridge line 7.

Although the top portion of the convex part 37 continuously may become lower in a non-limiting embodiment illustrated in FIG. 15, it may not be intended to limit to this embodiment. The convex part 37 may include a part thereof where the distance between the top portion of the convex part 37 and the reference plane S1 is constant.

The length of the distance D2 is not particularly limited. For example, a portion having a maximum distance D2 may be expressed by 0.01 M1 to 0.4 M1 where M1 is the length of the first cutting edge 17.

In cases where the convex part 37 is in contact with the ridge line 7, the ridge line located on both sides of the convex part 37 may correspond to a first ridge line 27' and a second ridge line 29', a part of the first surface 3 which is located from the first ridge line 27' toward the midportion of the first surface 3 may be a third region 33', and a part of the first surface 3 which is located from the second ridge line 29' toward the midportion of the first surface 3 may be a fourth region 35'. The third region 33' and the fourth region 35' may serve as a rake surface.

A part of the first cutting edge 17 which is located more away from the first corner 9 than the convex part 37 may correspond to the first ridge line 27'. A part of the first cutting edge 17 which is located closer to the first corner 9 than the convex part 37 may correspond to the second ridge line 29'. A part of the first region 21 which is located along the first ridge line 27' may correspond to the third region 33'. A part of the first region 21 which is located along the second ridge line 29' may correspond to the fourth region 35'.

An angle formed by the third region 33' and the reference plane S1 orthogonal to the central axis P of the insert 1' may be a first angle θ1'. An angle formed by the reference plane S1 and the fourth region 35' may be a second angle θ2'. A value of the first angle θ1' may be identical with or different from a value of the second angle θ2'. For example, the second angle θ2' may be larger than the first angle θ1'.

If the first angle θ1' is different from the second angle θ2', a part of chips flowing through the third region 33' may be different from the other part flowing through the fourth region 35' in chip flow velocity. Accordingly, the part of the chip bent by the convex part 37 may tend to be torn off and divided apart due to velocity differences between chips flowing through the third region 33' and chips flowing through the fourth region 35'.

In the front view of the second surface 5, the first ridge line 27' and the second ridge line 29' may be located on an imaginary straight line. Alternately, an imaginary extension line L1 of the first ridge line 27' may intersect with an imaginary extension line L2 of the second ridge line 29' as in a non-limiting embodiment illustrated in FIG. 16.

A portion indicated by an imaginary straight line L4 that connects an intersection point of the convex part 37 and the first ridge line 27' and an intersection point of the convex part 37 and the second ridge line 29' may be a bottom portion of the convex part 37 in the front view of the second surface 5. If the imaginary extension line L1 is located closer to the top portion of the convex part 37 than the bottom portion of the convex part 37 as in a non-limiting embodiment illustrated in FIG. 17, chip clogging may be less likely to occur in the vicinity of a boundary between the convex part 37 and the first ridge line 27'. FIG. 17 may be an enlarged view of a region in the insert 1 in a non-limiting embodiment which corresponds to FIG. 16.

Figure 16:
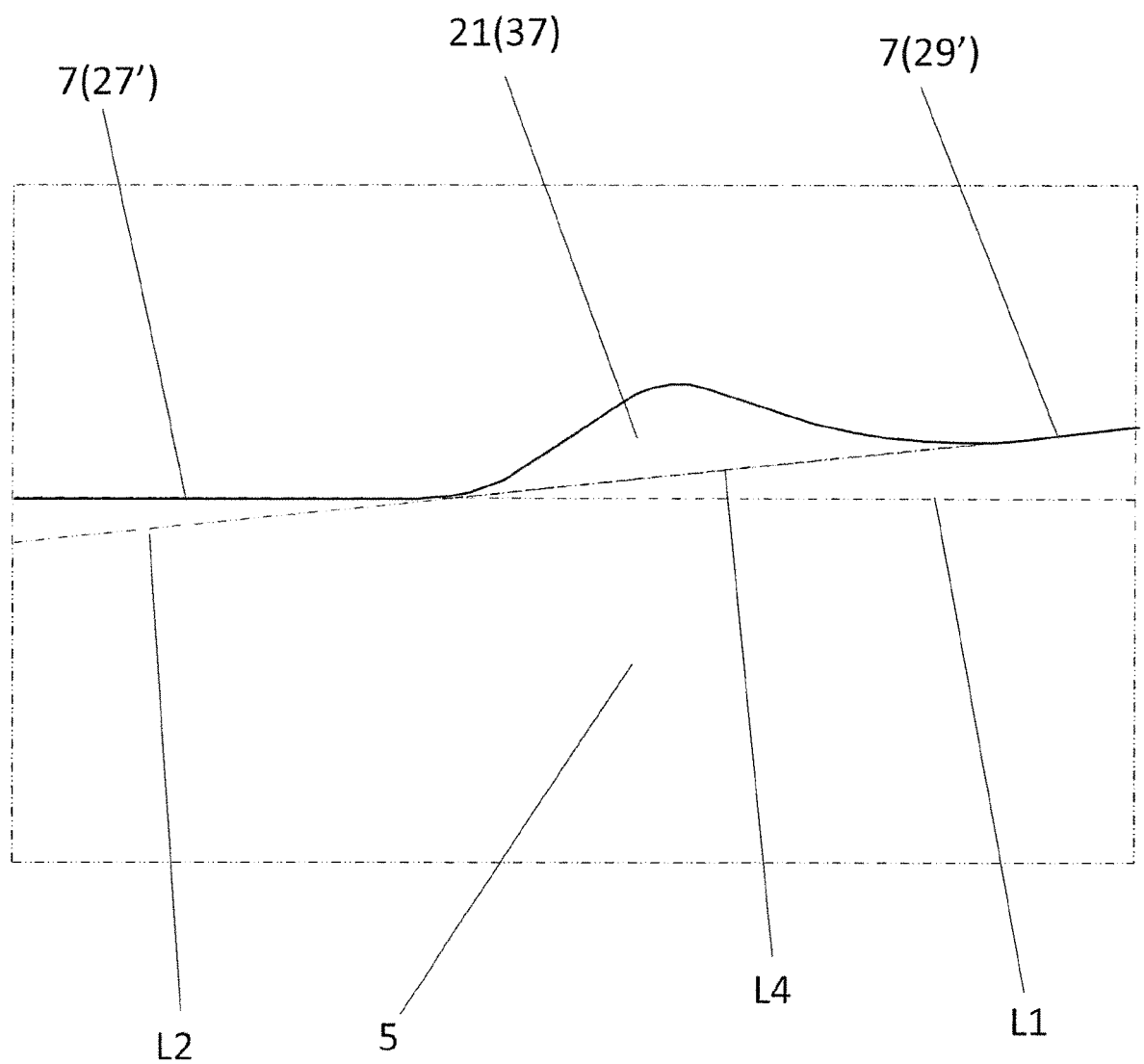
FIG. 16 is an enlarged view of a region B3 in FIG. 14.
Figure 17:
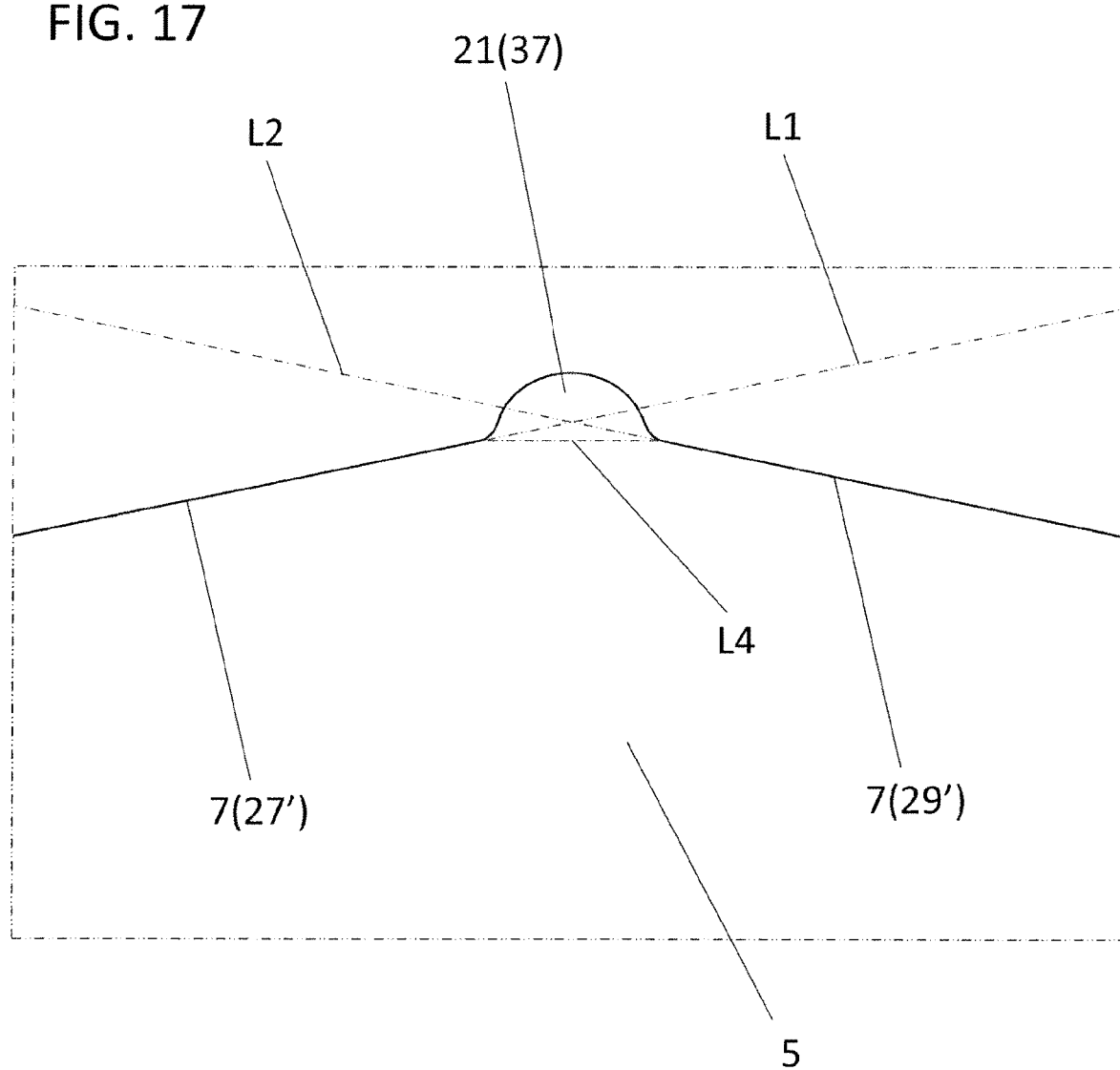
FIG. 17 is an enlarged view of a cutting insert in a non-limiting embodiment.

If the imaginary extension line L1 is located further away from the top portion of the convex part 37 than the bottom portion of the convex part 37 as in a non-limiting embodiment illustrated in FIG. 16, chips may be likely to be bent in the vicinity of the boundary between the convex part 37 and the first ridge line 27'. The chips may be therefore more likely to be divided apart.

If the imaginary extension line L2 is located closer to the top portion of the convex part 37 than the bottom portion of the convex part 37 as in a non-limiting embodiment illustrated in FIG. 17, chip clogging may be less likely to occur in the vicinity of the boundary between the convex part 37 and the second ridge line 29'.

If the imaginary extension line L2 is located further away from the top portion of the convex part 37 than the bottom portion of the convex part 37, chips may be likely to be bent in the vicinity of a boundary between the convex part 37 and the second ridge line 29'. The chips may be therefore more likely to be divided apart.

In a non-limiting embodiment illustrated in FIG. 17, the imaginary extension line L1 may intersect with the imaginary extension line L2, and the imaginary extension line L1 and the imaginary extension line L2 may be located closer to the top portion of the convex part 37 than the bottom portion of the convex part 37. If the imaginary extension line L1 and the imaginary extension line L2 are located as described above, chip clogging may be much less likely to occur in the vicinity of the boundary between the concave part 37 and the first ridge line 27' and in the vicinity of the boundary between the convex part 37 and the second ridge line 29'.

A length of the first ridge line 27' and a length of the second ridge line 29' are not limited to a specific value. For example, the first ridge line 27' may have the same length as the second ridge line 29'. Alternatively, the length of the first ridge line 27' may be different from the length of the second ridge line 29'.

<Cutting Tool>

Figure 18:
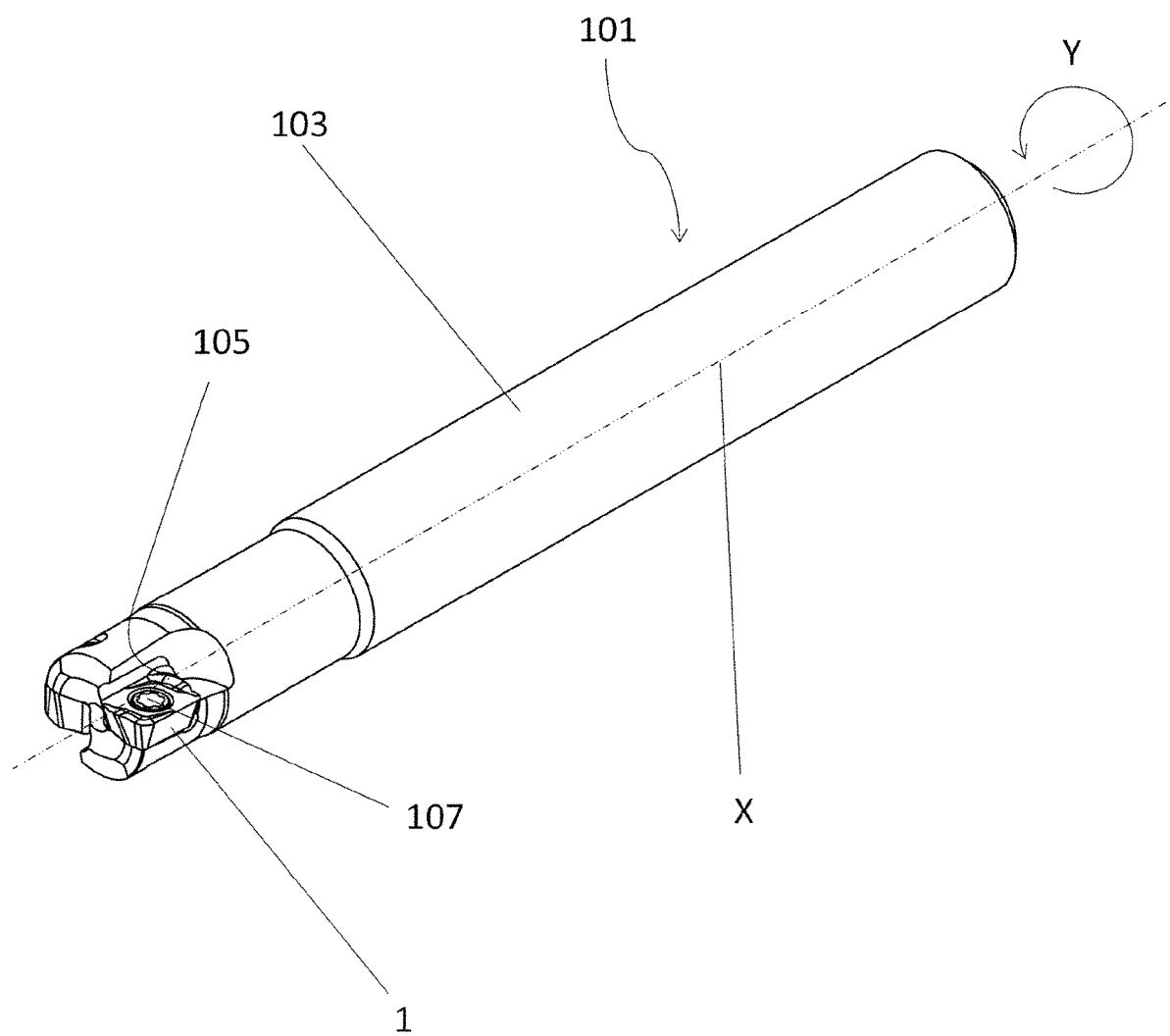
FIG. 18 is a perspective view illustrating a cutting tool in a non-limiting embodiment.
Figure 19:
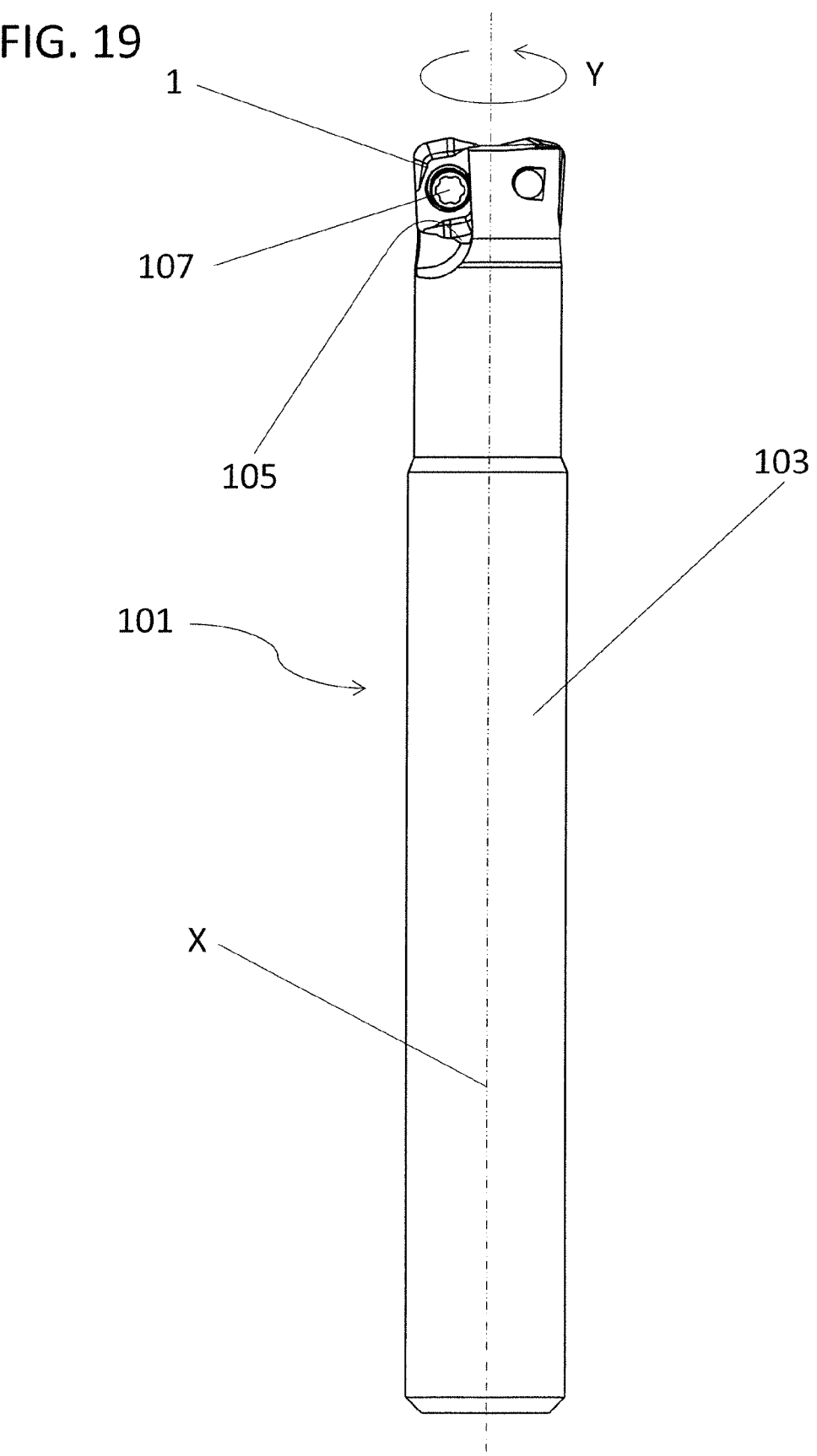
FIG. 19 is a side view of the cutting tool illustrated in FIG. 18.

A cutting tool in a non-limiting embodiment of the present disclosure may be described below with reference to the drawings. FIGS. 18 and 19 may illustrate a state in which the insert 1 illustrated in FIG. 1 is attached to an insert pocket 105 (hereinafter also referred to simply as "pocket 105") of a holder 103 by a screw 107. A rotation axis X of the cutting tool 101 may be indicated by a two-dot chain line in FIG. 18 or the like.

The cutting tool 101 of a non-limiting embodiment is usable for a milling process. As illustrated in FIG. 18 or the like, the cutting tool 101 may have the rotation axis X1 and may include the holder 103 with a plurality of pockets 105 on an outer peripheral surface at a side of a front end of the cutting tool 101, and inserts represented by the foregoing non-limiting embodiment which are individually attached to the pockets 105. The insert 1 in the above embodiment may be illustrated as the inserts in FIGS. 18 and 19.

The holder 103 may be a bar-shaped body extended from a first end (lower left end in FIG. 18) to a second end (upper right end in FIG. 18). The plurality of pockets 105 may be located on an outer peripheral surface at a side of the first end of the holder 103. The pockets 105 may be parts that respectively permit attachment of the inserts 1 and open into an outer peripheral surface and the first end of the holder 103.

The pockets 105 may be disposed at equal or unequal intervals along a rotation direction Y of the rotation axis X. The holder 103 may include the pockets 103 formed therein, and therefore may not have a strict cylindrical shape.

Each of the inserts 1 is attachable to the pockets 105 by the screw 107. That is, the insert 1 is attachable to the holder 103 by inserting the screw 107 into a through hole of the insert 1, and by inserting a front end of the screw 107 into a screw hole formed in the pocket 105 so as to fix the screw 107 to the screw hole.

Steel or cast iron is usable for the holder 103. Of these materials, high-toughness steel may be particularly used. There is no problem even if the cutting tool 101 includes the inserts 1' of a non-limiting embodiment instead of the inserts 1 of a non-limiting embodiment.

<Method for Manufacturing Machined Product>

A method for manufacturing a machined product in non-limiting embodiments of the present disclosure may be described below with reference to the drawings.

The machined product is manufacturable by carrying out a cutting process of a workpiece. The method for manufacturing a machined product in a non-limiting embodiment may include the following steps:

the step (1) of rotating the cutting tool 101 represented by the above embodiments;

the step (2) of bringing the cutting edge in the cutting tool 101 being rotated into contact with the workpiece 201; and the step (3) of moving the cutting tool 101 away from the workpiece 201.

Figure 20:
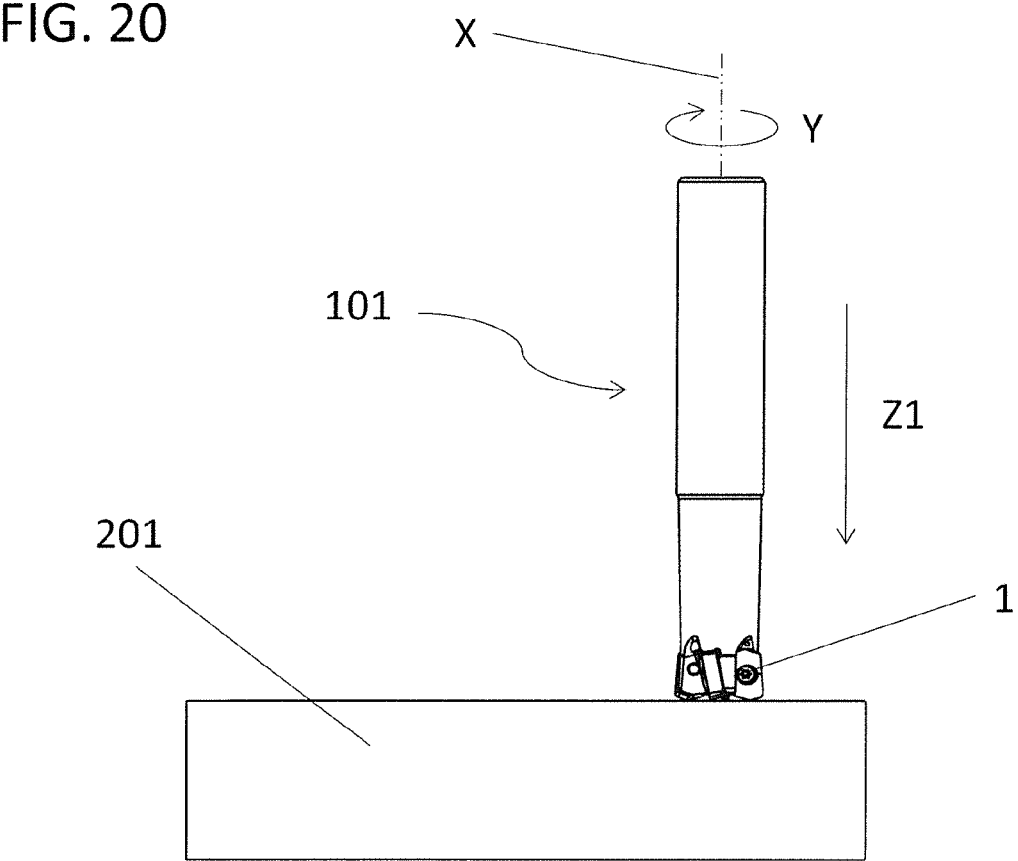
FIG. 20 is a diagram illustrating one of the steps in a method for manufacturing a machined product in a non-limiting embodiment.
Figure 21:
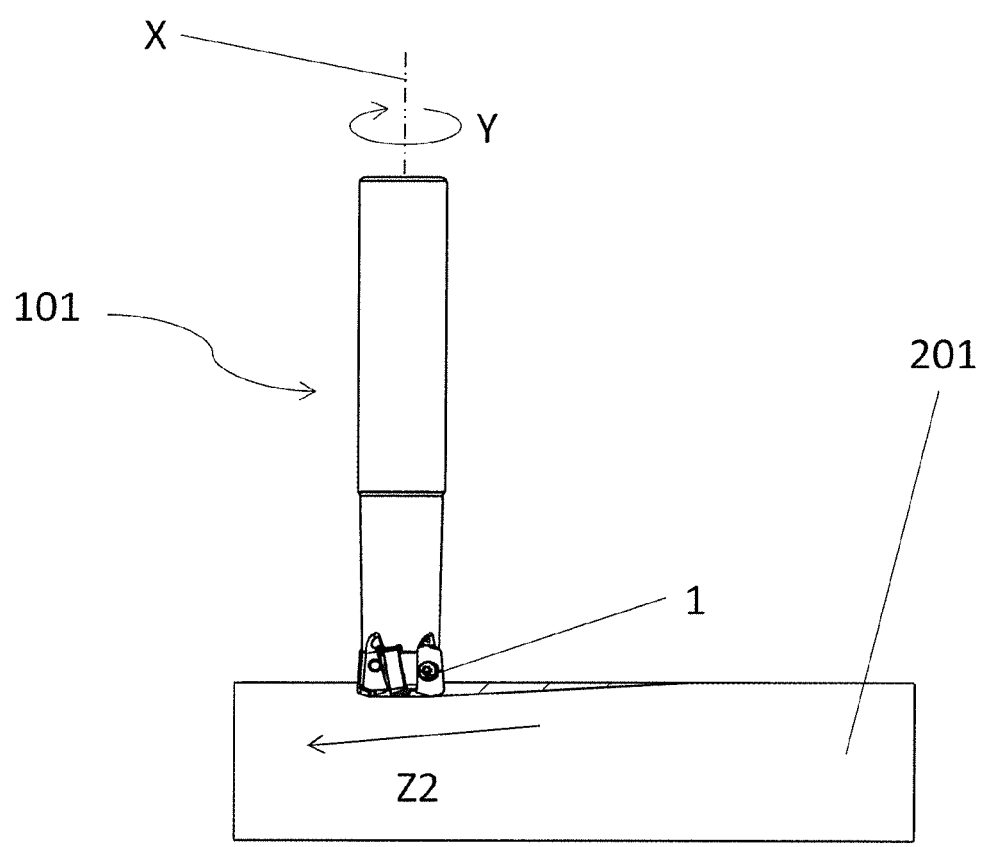
FIG. 21 is a diagram illustrating one of the steps in the method for manufacturing a machined product in the non-limiting embodiment.
Figure 22:
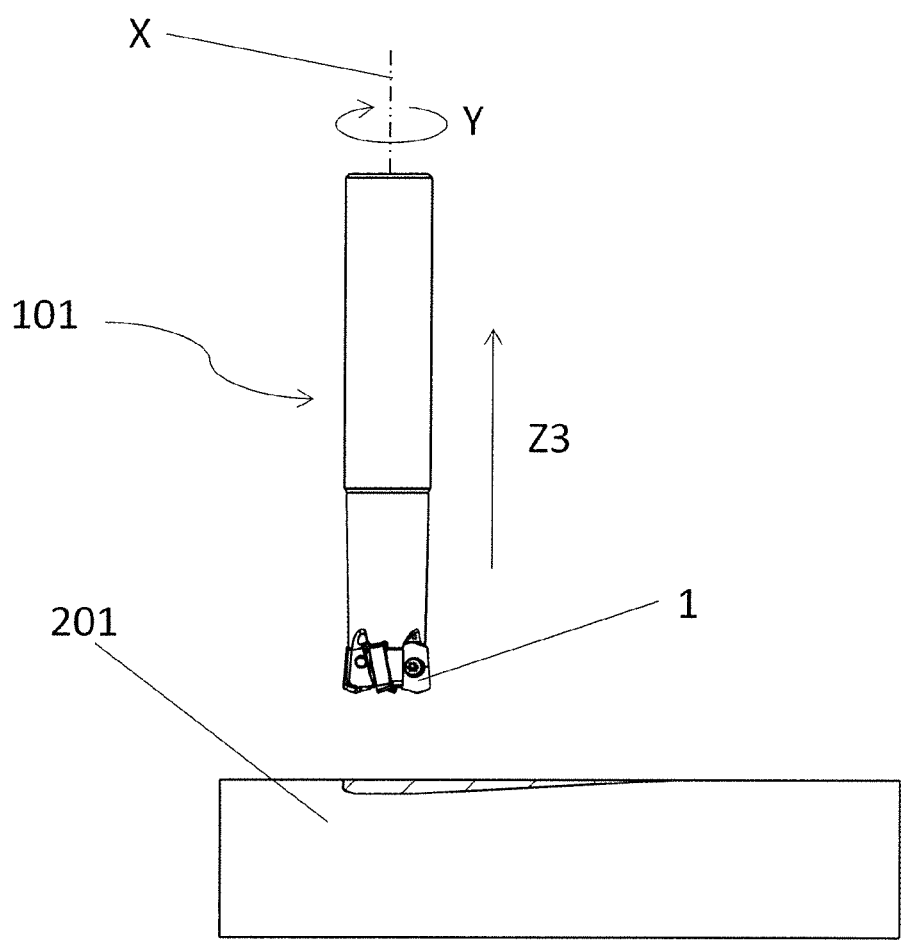
FIG. 22 is a diagram illustrating one of the steps in the method for manufacturing a machined product in the non-limiting embodiment.

More specifically, firstly, the rotary tool 101 may be rotated around the rotation axis X and in the rotation direction Y, and the cutting tool 101 may be relatively brought near the workpiece 201 as illustrated in FIG. 20. Subsequently, the workpiece 201 may be cut out by bringing at least one of the first cutting edge and the second cutting edge in the cutting tool 101 being rotated into contact with the workpiece 201 as illustrated in FIG. 21. The cutting tool 101 may be then relatively moved away from the workpiece 201 as illustrated in FIG. 22. In order to facilitate visual understanding, a region of the workpiece 201 cut out by the cutting tool 101 may be indicated by slant lines in FIGS. 21 and 22.

In a non-limiting embodiment illustrated in FIG. 20, the cutting tool 101 may be brought near the workpiece 201 by being moved in a Z1 direction along the rotation axis X in a state in which the workpiece 201 is fixed and the cutting tool 101 may be rotated. In FIG. 21, the workpiece 201 may be cut out by bringing at least one of the corner cutting edge, the first cutting edge and the second cutting edge in the cutting tool 101 into contact with the workpiece 201 while the cutting tool 101 being rotated is moved in a Z2 direction. In FIG. 22, the cutting tool 101 being rotated may be moved away by being moved in a Z3 direction.

In a non-limiting embodiment illustrated in FIG. 21, the Z2 direction may be not a direction orthogonal to the Z1 direction but a direction inclined relative to the Z1 direction. If the Z2 direction is thus inclined relative to the Z1 direction, a ramping process can be carried out. If the Z2 direction is a direction orthogonal to the Z1 direction, a flattening process can be carried out.

In the cutting process with the manufacturing method of a non-limiting embodiment, the cutting tool 101 may be brought into contact with the workpiece 201, or the cutting tool 101 may be moved away from the workpiece 201 by moving the cutting tool 101 in the individual steps. It may, of course, not be intended to limit to this embodiment.

For example, the workpiece 201 may be brought near the cutting tool 101 in the step (1). Similarly, the workpiece 201 may be moved away from the cutting tool 101 in the step (3). If desired to continue the cutting process, the step of bringing the cutting edges in the cutting tool 101 into contact with different portions of the workpiece 201 may be repeated while keeping the cutting tool 101 rotated.

Examples of material of the workpiece 201 may include carbon steel, alloy steel, stainless steel, cast iron and non-ferrous metals.

Non-limiting embodiments in the present disclosure have been illustrated and described above. However, the present disclosure is not limited to the foregoing embodiments. Non-limiting embodiments may include any arbitrary configuration without departing from the gist of the present disclosure.

DESCRIPTION OF THE REFERENCE NUMERAL

1, 1' insert
3 first surface
5 second surface
6 third surface
7 ridge line
9 first corner
11 first side
13 second side
15 corner cutting edge
17 first cutting edge
19 second cutting edge
21 first region
23 second region
25 concave part
27, 27' first ridge line
29, 29' second ridge line
33, 33' third region
35, 35' fourth region
37 convex part
39 hole
101 cutting tool
103 holder
105 pocket
107 screw
201 workpiece
$\theta 1$ first angle
$\theta 2$ second angle
P central axis of insert
S1 reference plane
X rotation axis
Y rotation direction
L1 imaginary extension line
L2 imaginary extension line
L3 imaginary straight line
L4 imaginary straight line

The invention claimed is:

1. An insert, comprising:
a first surface;
a second surface; and
a ridge line located at an intersection of the first surface and the second surface, wherein
the first surface comprises
a first corner that protrudes furthest from the insert toward a workpiece during a cutting process,
a first side extended from the first corner and located on an inner peripheral side than the first corner during the cutting process, and
a second side extended from the first corner and located on an outer peripheral side than the first corner during the cutting process,
the ridge line comprises
a corner cutting edge located on the first corner,
a first cutting edge located on the first side, and
a second cutting edge located on the second side, and the first surface further comprises
a first region located from the first cutting edge toward a midportion of the first surface,
a second region located from the second cutting edge toward the midportion of the first surface,
a convex part, and
the convex part is located only on the first region.

2. The insert according to claim 1, wherein the convex part connects to the second surface.

3. The insert according to claim 1, wherein the convex part comprises a part that becomes narrower as going away from the ridge line.

4. The insert according to claim 1, the insert comprises a central axis, wherein
in a side view of the insert toward the first corner, the convex part is located on an inner peripheral side than the central axis during a cutting process.

5. An insert, comprising:
a first surface;
a second surface; and
a ridge line located at an intersection of the first surface and the second surface, wherein
the first surface comprises
a first side that is a straight line shape,
a second side that is a straight line shape and facing the first side,
a first part connecting the first side with the second side,
a second part connecting the first side with the second side and facing the first part,
a first corner located on the first part,
a third side extended from the first corner, and
a fourth side extended from the first corner,
the ridge line comprises
a corner cutting edge located on the first corner,
a first cutting edge located on the third side, and
a second cutting edge located on the fourth side, and
the first surface further comprises
a first region located from the first cutting edge toward a midportion of the first surface,
a second region located from the second cutting edge toward the midportion of the first surface,
a convex part, and
the convex part is located only on the first region.

6. The insert according to claim 5, the insert comprises a central axis, wherein
in a side view of the insert toward the first corner, the concave part is located on an inner peripheral side than the central axis during a cutting process.

* * * * *